United States Patent
Horn et al.

(10) Patent No.: US 9,642,009 B2
(45) Date of Patent: May 2, 2017

(54) MANAGING UE SUBSCRIPTION ESTABLISHMENT

(71) Applicant: QUALCOMM Incorporated, San Diego, CA (US)

(72) Inventors: Gavin Bernard Horn, La Jolla, CA (US); Stefano Faccin, Hayward, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/543,492

(22) Filed: Nov. 17, 2014

(65) Prior Publication Data

US 2015/0350870 A1 Dec. 3, 2015

Related U.S. Application Data

(60) Provisional application No. 62/007,405, filed on Jun. 3, 2014.

(51) Int. Cl.
  *H04W 4/00* (2009.01)
  *H04W 12/08* (2009.01)
  *H04W 8/02* (2009.01)
  *H04W 48/16* (2009.01)
  *H04W 60/06* (2009.01)

(52) U.S. Cl.
  CPC ............. *H04W 12/08* (2013.01); *H04W 8/02* (2013.01); *H04W 48/16* (2013.01); *H04W 60/06* (2013.01)

(58) Field of Classification Search
  CPC ....................................................... H04W 8/02
  See application file for complete search history.

(56) References Cited

U.S. PATENT DOCUMENTS

| | | | |
|---|---|---|---|
| 8,417,243 B2 | 4/2013 | Miklos | |
| 2003/0114154 A1 | 6/2003 | Lin et al. | |
| 2007/0184825 A1 | 8/2007 | Lim et al. | |
| 2009/0196265 A1* | 8/2009 | Nieves .................. | H04W 8/065 370/338 |
| 2010/0144311 A1 | 6/2010 | Pehrson et al. | |
| 2013/0203435 A1 | 8/2013 | Smith et al. | |

(Continued)

FOREIGN PATENT DOCUMENTS

WO   WO 2010086029 A1   8/2010

OTHER PUBLICATIONS

ISA/EPO, International Search Report and Written Opinion of the International Searching Authority, Int'l Appl. No. PCT/US2015/029026, Jul. 9, 2015, European Patent Office, Rijswijk, NL, 8 pgs.

(Continued)

*Primary Examiner* — Idowu O Osifade
(74) *Attorney, Agent, or Firm* — Holland & Hart LLP

(57) ABSTRACT

Methods, systems, and devices are described for managing user equipment (UE) subscription establishment with networks outside of a home network. A UE may determine whether it is authorized to operate in an unsubscribed state and/or to initiate a local subscription establishment procedure with a non-home network. A home network operator may authorize the UE to operate in an unsubscribed state and/or to initiate a local subscription establishment procedure at non-home networks. When authorized to do so, the UE may initiate a subscription establishment procedure.

96 Claims, 15 Drawing Sheets

(56) References Cited

U.S. PATENT DOCUMENTS

2013/0279456 A1 10/2013 Wang
2013/0295924 A1* 11/2013 Sutherns ............... H04W 8/06
 455/433
2015/0245258 A1* 8/2015 Kim ..................... H04W 48/18
 370/331

OTHER PUBLICATIONS

IPEA/EP, Second Written Opinion of the International Preliminary Examining Authority, Int'l Appl. No. PCT/US2015/029026, May 30, 2016, European Patent Office, Munich, DE, 5 pgs.

* cited by examiner

MANAGING UE SUBSCRIPTION
ESTABLISHMENT

CROSS REFERENCES

The present Application for Patent claims priority to U.S. Provisional Patent Application No. 62/007,405 by Horn et al., entitled "Managing UE Subscription Establishment," filed Jun. 3, 2014, assigned to the assignee hereof, and expressly incorporated by reference herein.

BACKGROUND

The following relates generally to wireless communication, and more specifically to managing user equipment (UE) subscription establishment.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, e.g., a Long Term Evolution (LTE) system.

Generally, a wireless multiple-access communications system may include a number of base stations, each simultaneously supporting communication for multiple mobile devices or other user equipment (UE). Base stations may communicate with UEs on downstream and upstream links. Each base station has a coverage range, which may be referred to as the coverage area of a cell.

In some cases, users may travel with their UE outside the coverage area of base stations within the user's cellular service provider's network—an experience many people have when traveling outside their country of residence. In such cases, users may be forced to choose between finding a non-cellular service connection (e.g., a wireless local area network (WLAN)) or utilizing a roaming service to connect with a local network. The present disclosure provides mechanisms for establishing local subscriptions outside of a user's home network, thereby increasing his or her connectivity choices and offering alternatives to roaming or non-cellular options.

SUMMARY

The described features generally relate to one or more improved systems, methods, and/or apparatuses for managing user equipment (UE) subscription establishment with networks outside of a home network. A UE may determine whether it is authorized to initiate a local subscription establishment procedure with the access network. For example, a home network operator may authorize the UE to initiate a local subscription establishment procedure. When authorized to do so, the UE may initiate a local subscription establishment procedure.

A method of managing UE subscription establishment is described. The method may include identifying, by a UE, an access network as a candidate for connection, determining that the UE is authorized to initiate a local subscription establishment procedure with the access network based at least in part on the identifying the access network as a candidate, and initiating the local subscription establishment procedure with the access network based at least in part on the determining.

An apparatus for managing UE subscription establishment is described. The apparatus may include means for identifying, by a UE, an access network as a candidate for connection, means for determining that the UE is authorized to initiate a local subscription establishment procedure with the access network based at least in part on the identifying the access network as a candidate, and means for initiating the local subscription establishment procedure with the access network based at least in part on the determining.

A further apparatus for managing UE subscription establishment is also described. The apparatus may include a processor, memory in electronic communication with the processor, and instructions stored in the memory. The instructions may be executable by the processor to identify, by a UE, an access network as a candidate for connection, determine that the UE is authorized to initiate a local subscription establishment procedure with the access network based at least in part on the identifying the access network as a candidate, and initiate, the local subscription establishment procedure with the access network based at least in part on the determining.

A non-transitory computer-readable medium storing code for managing UE subscription establishment is also described. The code may include instructions executable to identify, by a UE, an access network as a candidate for connection, determine that the UE is authorized to initiate a local subscription establishment procedure with the access network based at least in part on the identifying the access network as a candidate, and initiate, the local subscription establishment procedure with the access network based at least in part on the determining.

In some examples of the method, apparatuses, and/or computer-readable medium, the UE is authorized to establish a connection with the access network utilizing a roaming subscription based on a home subscription, and the UE initiates the local subscription establishment procedure as an unsubscribed user instead of utilizing the roaming subscription and establishing a connection as a roaming user. In some examples, initiating the local subscription establishment procedure comprises obtaining credentials for accessing the access network. Obtaining the credentials for accessing the access network may be performed in-band with the access network. Additionally or alternatively, the access network may be a public land mobile network (PLMN).

Some examples of the method, apparatuses, and/or computer-readable medium described above include features of, means for, and/or processor-executable instructions for prompting a user of the UE to decide between initiating the local subscription establishment procedure and utilizing the roaming subscription. The prompting may include displaying an identifier of the access network to the user, and receiving a user input to initiate the local subscription establishment procedure.

In some examples of the method, apparatuses, and/or computer-readable medium described above, identifying the access network is based on a PLMN identifier or other access network identifier. Determining that the UE is authorized to initiate the local subscription establishment procedure with the access network may include determining that the PLMN identifier or other access network identifier is present in a list of allowed networks. Alternatively, determining that the UE is authorized to initiate a local subscription establishment procedure with the access network may include determining that the PLMN identifier or other access network identifier is excluded from a list of forbidden networks.

In some examples of the method, apparatuses, and/or computer-readable medium described above, identifying the access network is based at least in part on determining that the UE is within a coverage area of the access network. Additionally or alternatively, identifying the access network may be based at least in part on determining that the UE is outside the coverage area of a home public land mobile network (HPLMN).

Some examples of the method, apparatuses, and/or computer-readable medium described above include the features of, means for, and/or processor-executable code for determining by the UE that it is permitted to establish the local subscription with the access network based at least in part on a configuration of the UE. The configuration of the UE may include a flag indicating that local subscription procedures may be utilized at one or more access networks. In some examples, the availability of the local subscription procedures may be configured based on at least one of a current location of the UE, a time of day, an absence of other available coverage, or applications currently active on the UE. Additionally or alternatively, the configuration may include a management object at the UE. The management object may facilitate establishing the local subscription with the access network.

Some examples of the method, apparatuses, and/or computer-readable medium described above may include the features of, means for, and/or processor-executable instructions for displaying information about available networks to a user of the UE, and/or receiving input from the user indicative of an access network at which to initiate the local subscription establishment procedure. Additionally or alternatively, some examples may include the features of, means for, and/or processor-executable instructions for receiving input from the user to display the information about available networks.

In some examples of the method, apparatuses, and/or computer-readable medium described above, initiating the local subscription establishment procedure may include establishing a session with a provisioning server. Some examples may further include the features of, means for, and/or processor-executable instructions for receiving credentials for the access network from the provisioning server. In some examples, initiating the local subscription establishment procedure may include transmitting a connection establishment request via the access network, the connection establishment request indicative of a desired provisioning server.

In some examples of the method, apparatuses, and/or computer-readable medium described above, the UE may be in an unsubscribed state in which local subscription establishment procedures may be utilized and/or through which the UE may transition when moving to/from a deregistered state as part of its mobility management. Some examples may include the features of, means for, and/or processor-executable instructions for transitioning from the unsubscribed state to a deregistered state upon completing the local subscription establishment procedure. Some examples may include the features of, means for, and/or processor-executable instructions for entering the unsubscribed state upon determining that local subscription information for the UE is unavailable at the access network, transitioning to a deregistered state, and camping on the access network upon obtaining credentials for the access network through the local subscription establishment procedure.

Some examples of the method, apparatuses, and/or computer-readable medium described above may include the features of, means for, and/or processor-executable instructions for determining to establish a connection with a VPLMN upon losing a connection with the access network. In some examples, the access network includes a non-operator controlled access point.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A user equipment may initiate and/or undertake a local subscription establishment procedure with authorization from a home network operator. The home network operator may control when and on what networks a user or user equipment (UE) is allowed to perform such a procedure. For example, a network operator may allow a UE to operate in an unsubscribed state. This unsubscribed state may be a state in which a UE is allowed to undertake certain administrative communications with a network outside the home network. The unsubscribed state may, for instance, allow a UE to become a registered subscriber for service at a non-home network (e.g., a visited public land mobile network (VPLMN)). From the unsubscribed state, the UE may automatically or with user input, create a local subscription with a non-home network.

To facilitate the novel local subscription procedures, a new mobility management state may be utilized. In the UNSUBSCRIBED state, a home subscriber server (HSS) of a network at which the UE seeks access has no stored context information about the UE; and therefore the network has no subscription information about the UE. As discussed below, the unsubscribed state differs from an ordinary roaming scenario in which the UE, for example, may approach the network in a deregistered state. Unlike roaming, the UE may establish new credentials (e.g., a local subscription) with a non-home network (e.g., VPLMN) rather than relying on roaming agreements between network operators. These newly established credentials may be independent of credentials maintained by the UE's home network (e.g., home public land mobile network (HPLMN)). Thus, an unsubscribed UE may establish a secure connection with a non-home network in order to establish a local subscription with that non-home network, and the UE may maintain an independent home subscription with its home network.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
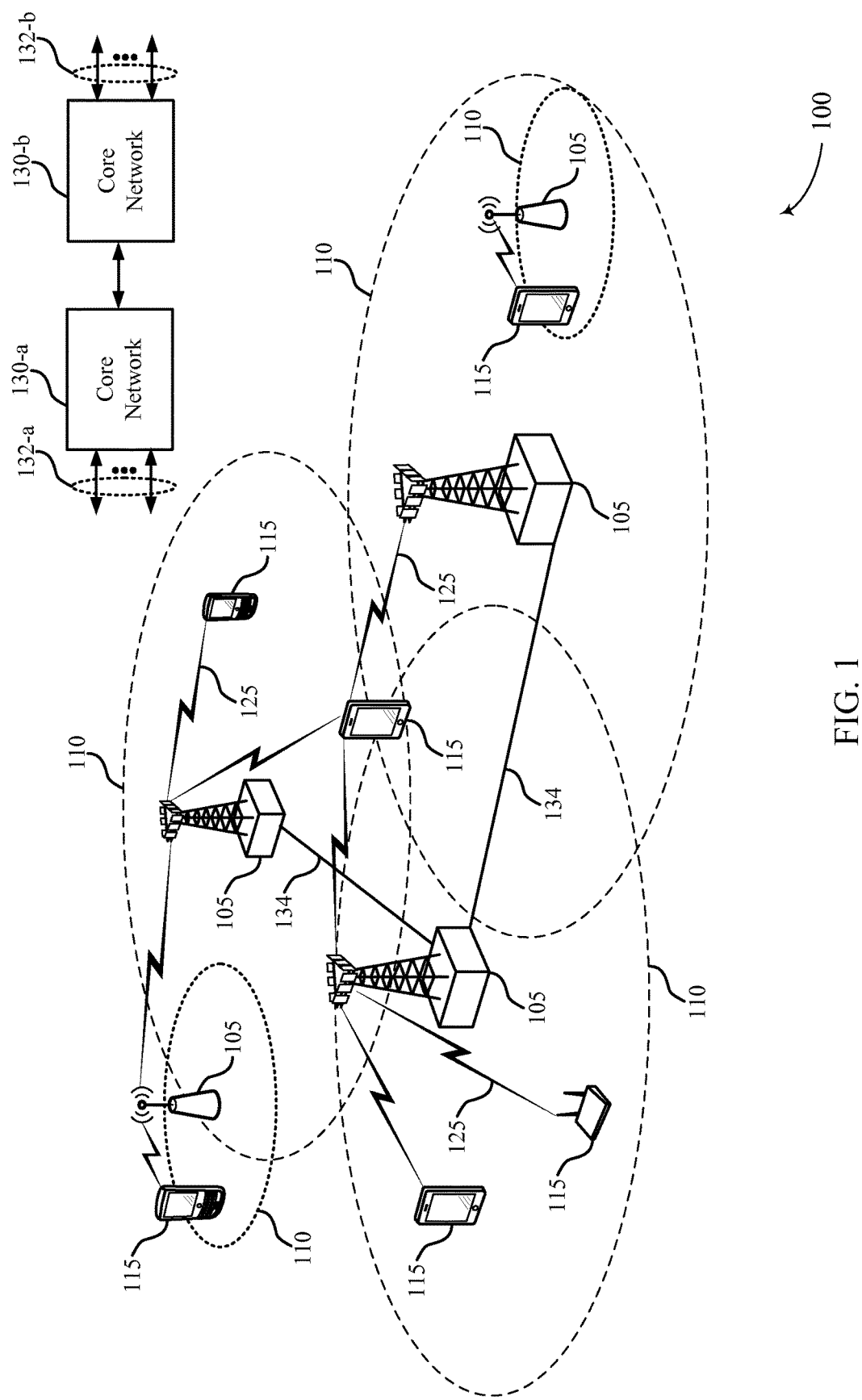
FIG. 1 illustrates an example of a wireless communications system configured for managing UE subscription establishment.

FIG. 1 illustrates an example of a wireless communications system 100 in accordance with various embodiments. The system 100 includes base stations 105, communication devices, also known as user equipment (UE) 115, and a core networks 130. The base stations 105 may communicate with the UEs 115 under the control of a base station controller (not shown), which may be part of the core networks 130 or the base stations 105 in various embodiments. Base stations 105 may communicate control information and/or user data with their respective core networks 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, evolved node B (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

The system 100 may be a Heterogeneous Long Term Evolution (LTE)/LTE-A network in which different types of base stations provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core networks 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

In some examples, the system 100 includes base stations 105 associated with different networks. Thus, each core network 130 may be associated with a particular group base stations 105 to make up a network (e.g., a public land mobile network (PLMN)) operated by a wireless service provider. For example, core network 130-$a$ may be associated with a network operated by a cellular service provider in one country or region, while core network 130-$b$ may be associated with a cellular service provider located in a different country or region. Base stations 105 of different networks (e.g., PLMNs) may be physically located within a common geographic area or they may be physically isolated from one another. For instance, the coverage areas 110 may represent coverage areas of base stations 105 providing access to different networks owned and operated by different cellular service providers. The base stations 105 may therefore be access points to networks controlled by different operators. The core networks 130 may communicate with one another to support roaming and/or other customer sharing agreements.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The system 100 may be configured for managed UE subscription establishment. The UEs 115 may thus be configured to operate in an unsubscribed state. For instance, a UE 115 may be outside the coverage area of, or otherwise unattached from, a home network with which the UE 115 maintains a subscription. The UE 115 may identify an access network (e.g., via a base station 105) as a candidate for connection. The UE 115 may determine whether it is authorized to initiate a local subscription establishment procedure with the access network, e.g., based on identifying the access network as a candidate. The UE 115 may then initiate the local subscription establishment procedure with the access network if authorized to do so.

The communication links 125 shown in system 100 may include uplink (UL) transmissions from a UE 115 to a base station 105, and/or downlink (DL) transmissions, from a base station 105 to a UE 115 over DL carriers. The downlink transmissions may also be called forward link transmissions while the uplink transmissions may also be called reverse link transmissions.

Figure 2A:
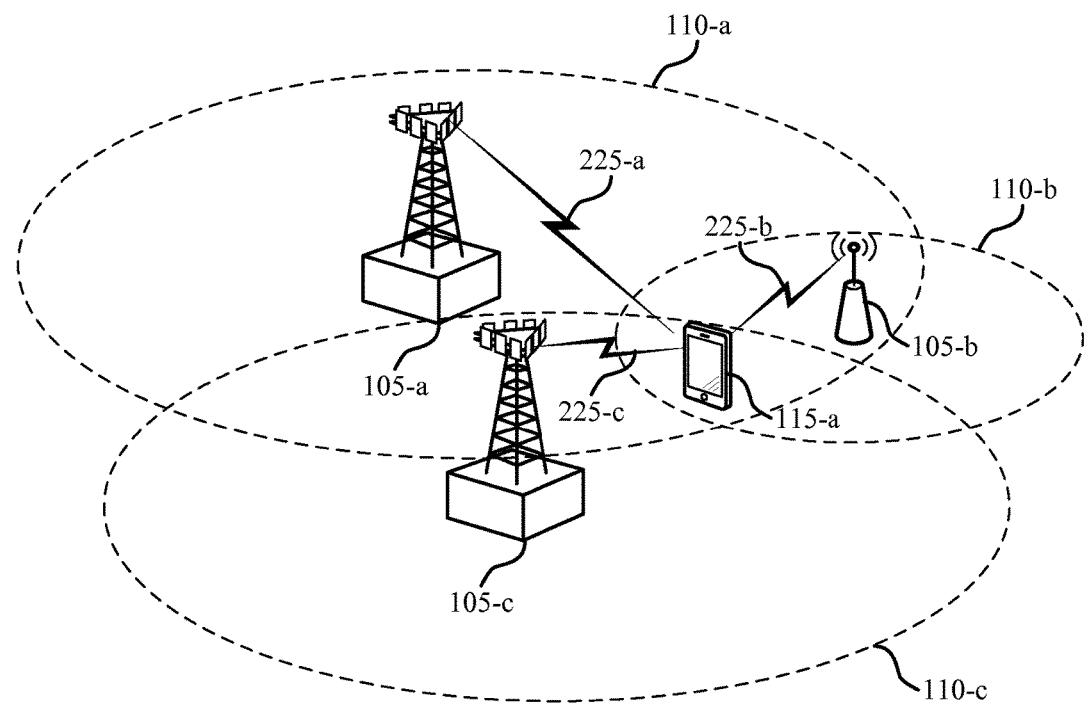
FIGS. 2A and 2B illustrate an example or examples of a wireless communications system configured for managing UE subscription establishment.

FIG. 2A illustrates an example of a wireless communications system 200-*a* configured for managing UE 115-*a* subscription establishment. The system 200-*a* may be an example of various aspects of the system 100 of FIG. 1.

The UE 115-*a* may be in an unsubscribed state. For instance, the UE 115-*a* may be outside the coverage area of a home network (e.g., HPLMN) such that each of the base stations 105 may be associated with access networks other than the UE's home network. In some examples, however, one or more of the base stations 105 may be associated with the UE's 115-*a* home network (e.g., HPLMN), while the other base stations are associated with a non-home network (e.g., VPLMN).

The UE 115-*a* may identify an access network as a candidate for connection. For instance, the UE 115-*a* may be powered on and commence an initial cell selection procedure. As discussed below, the UE's 115-*a* non-access stratum (NAS) layer may initiate the cell selection procedure by making a request to the UE's 115-*a* access stratum (AS) layer. In such cases, the UE 115-*a* may scan supported radio frequency (RF) channels. The UE 115-*a* may be within the coverage areas 110 of several base stations 105; and the UE 115-*a* may receive reference signals and system information from the base stations 105 via communication links 225. Thus, identifying an access network as a candidate for connection may be partially based on the UE 115-*a* determining that it is within a coverage area 110 of an access network (e.g., VPLMN) and/or outside the cover area of a home network (e.g., HPLMN). In some examples, the access network identified as a candidate for connection may be previously unknown to the UE 115-*a*. That is, in some cases, the UE 115-*a* may have no credentials for the access network identified as a candidate for connection when the UE 115-*a* first identifies the access network as a candidate.

The UE 115-*a* may read system information (e.g., system information block (SIB) 1) of each carrier (e.g., network broadcast channel) that the UE 115-*a* receives. The UE 115-*a* may thus identify an access network as a candidate for connection based on an access network identifier, such as a PLMN identifier, received from broadcast system information. In some examples, the UE 115-*a* receives signals from several base stations 105 associated with a single network (e.g., PLMN); in those instances, the UE 115-*a* may elect to read system information transmitted from the base station 105 with the strongest signal power (e.g., reference signal received power (RSRP)).

The UE 115-*a* may determine that it is authorized to initiate a local subscription establishment procedure with an access network based on identifying the access network as a candidate. The UE 115-*a* may thus not merely determine whether a non-home network is trusted; the UE 115-*a* may determine whether it is allowed to initiate a local subscription establishment procedure with the access network irrespective of whether the access network is trusted. For example, the UE's 115-*a* NAS layer may maintain a list of networks with which the UE 115-*a* may establish a local subscription. In some cases, the UE 115-*a* may be authorized to establish a connection with an access network (e.g., a VPLMN) as a roaming user, which may include utilizing a roaming subscription based on a home subscription. But the UE 115-*a* may initiate the local subscription establishment procedure as an unsubscribed user (e.g., a UE without a current subscription to the access network) instead of utilizing the roaming subscription. For instance, the UE 115-*a* may maintain a subscription with a home network (e.g., HPLMN), which may be accessed by a non-home network (e.g., VPLMN) under a roaming agreement between respective operators of the home and non-home networks. The UE 115-*a* may, however, be authorized to establish a local subscription with the non-home network without any subscription to the home and non-home networks, and it may (e.g., via a user input) elect to establish the local subscription in lieu of roaming. So, in some examples, the UE 115-*a* prompts a user of the UE 115-*a* to choose between initiating the local subscription establishment procedure or accessing the network as a roaming user. This prompting may include displaying an identifier of the access network to the user—e.g., via an application or user interface of the UE 115-*a*.

Unlike a roaming scenario, the local subscription establishment may allow the non-home base station to maintain credentials and/or context information about the UE 115-*a* within the HSS of the non-home network. In some examples, one or more local subscriptions (e.g., with VPLMNs) and home subscriptions (e.g., with an HPLMN) are currently maintained by the HSS of the respective networks.

The UE 115-*a* may be configured with a list of allowed or forbidden access networks. For example, the UE's 115-*a* NAS layer may maintain one or more such lists. The UE 115-*a* may determine that it is authorized to initiate the local subscription establishment procedure with the access network by determining that an access network identifier (e.g., a PLMN identifier) decoded from received system information is present in a list of allowed networks. Alternatively, the UE 115-*a* may determine that it is authorized to initiate a local subscription establishment procedure with the access network by determining that an access network identifier (e.g., a PLMN identifier) decoded from received system information is not in (e.g., excluded from) a list of forbidden networks.

Figure 2B:
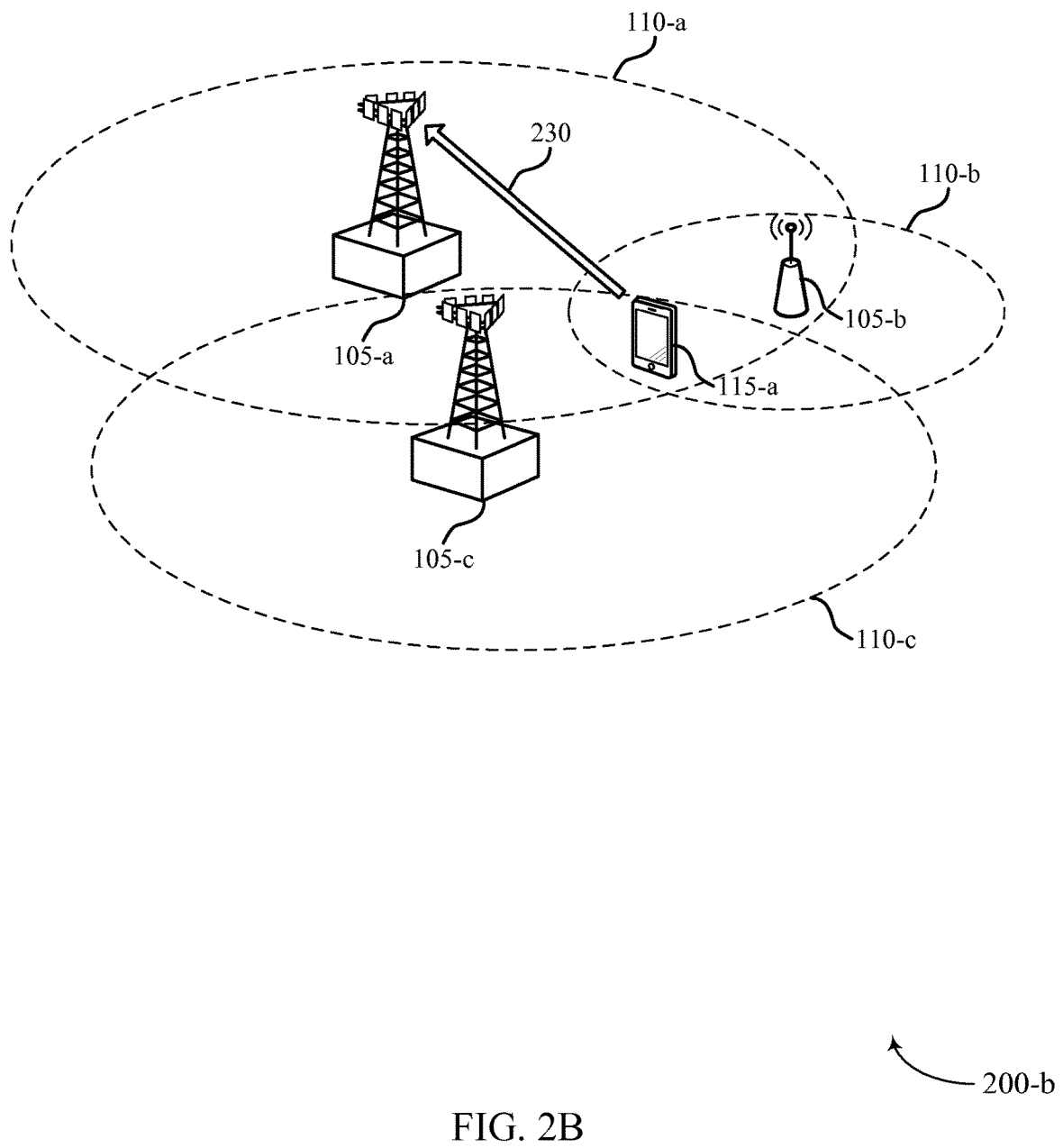

Upon determining that it is authorized to do so, the UE 115-*a* may initiate the local subscription establishment procedure. Referring to FIG. 2B—which illustrates an example of a wireless communications system 200-*b* configured for managing UE subscription establishment—the UE 115-*a* may initiate a local subscription establishment procedure with an access network via base station 105-*a* and communication link 230. The system 200-*b* may be an example of various aspects of the systems 100 and 200-*a* of FIGS. 1 and 2A. The UE 115-*a* may select the access network associated with base station 105-*a* from a number of candidate access networks within the system 200-*b*.

In various examples, the UE 115-*a* may be configured to initiate the local subscription establishment procedure automatically or manually. The UE 115-*a* may thus receive a user input to initiate the local subscription establishment procedure; or, in some instances, it may automatically initiate the local subscription establishment procedure upon some criterion being met (e.g., signal strength, time of day, location, etc.)

As discussed below, initiating the local subscription establishment procedure may include obtaining credentials for accessing the access network. The credentials for accessing the network may be obtained via in-band signaling with the access network via the base station 105-*a* and communication link 230. That is, in some examples, the UE 115-*a* communicates with a non-home network (e.g., access network, VPLMN, etc.) via an RF channel of the network without the necessity of an out-of-band (e.g., WLAN, WPAN, HPLMN, etc.) provisioning process.

In some examples, the UE 115-*a* may also determine, as a threshold matter, whether it is even permitted to establish a local subscription with a non-home network. That is, in some cases, the UE's 115-*a* configuration may dictate whether it may consider (e.g., identify) non-home networks (e.g., VPLMNs) as candidates for connection. For instance, the operator of a UE's 115-*a* home network (e.g., HPLMN) may control whether a UE 115-*a* is permitted to establish local subscriptions with non-home networks. Additionally or alternatively, the UE's 115-*a* home network operator may authorize local subscription establishment at select networks. The UE 115-*a* may thus be permitted to establish local subscriptions with a select group of non-home networks; it may be permitted to establish local subscriptions with any non-home networks; it may be forbidden from establishing local subscriptions with a select group of non-home networks; or it may not be permitted from establishing local subscriptions at all.

The UE 115-*a* may be configured with a flag from the home subscription (e.g., from its home network). For example, a Universal Subscriber Identity Module (USIM) application may indicate to the UE 115-*a* (e.g., to the NAS layer) that the UE 115-*a* is authorized to establish subscriptions with access networks other than the home network. Additionally or alternatively, a relevant configuration of the UE 115-*a*, for determining whether the UE 115-*a* is permitted to establish a local subscription, may be a current physical location of the UE 115-*a*, a time of day, an absence of other available coverage, and/or applications currently active on the UE 115-*a*. In some case, the configuration may include a restriction related to these parameters. In some examples, when the UE 115-*a* is configured such that local subscription establishment is permitted, the configuration may include a management object at the UE 115-*a*. The management object may facilitate establishing the subscription with the access network. For example, the management object may include information for the various networks with which the UE 115-*a* is authorized to establish a local subscription.

In some examples, when the UE 115-*a* initiates a local subscription establishment procedure the UE 115-*a* assumes or utilizes a manual PLMN selection mode (e.g., utilizing user input, as discussed above). This manual PLMN selection mode may be an alternative to an automatic selection mode typically employed by the UE 115-*a*. The manual PLMN selection mode may allow the UE 115-*a* to avoid erroneous or undesirable selection of networks: in some cases, if the UE 115-*a* utilizes automatic PLMN selection, it may move back to a PLMN with which the UE 115-*a* has a home or roaming subscription, and the UE 115-*a* may not use the local subscription. The manual PLMN selection mode described herein avoids such issues. While in the manual PLMN selection mode, the UE 115-*a* can maintain its connection with the network at which a local subscription has been established. When the UE 115-*a* later leaves coverage of the PLMN associated with the local subscription—e.g., the UE 115-*a* returns to the HPLMN coverage area—the UE 115-*a* may resume automatic PLMN selection. Accordingly, during or before a local subscription establishment procedure—e.g., upon switching from an automatic to a manual PLMN selection mode—the UE 115-*a* may store information related to a HPLMN and/or a last-visited PLMN. As discussed below, this stored information may include duplicate credentials for one or more PLMNs and/or duplicate credentials for a current PLMN.

Figure 3:
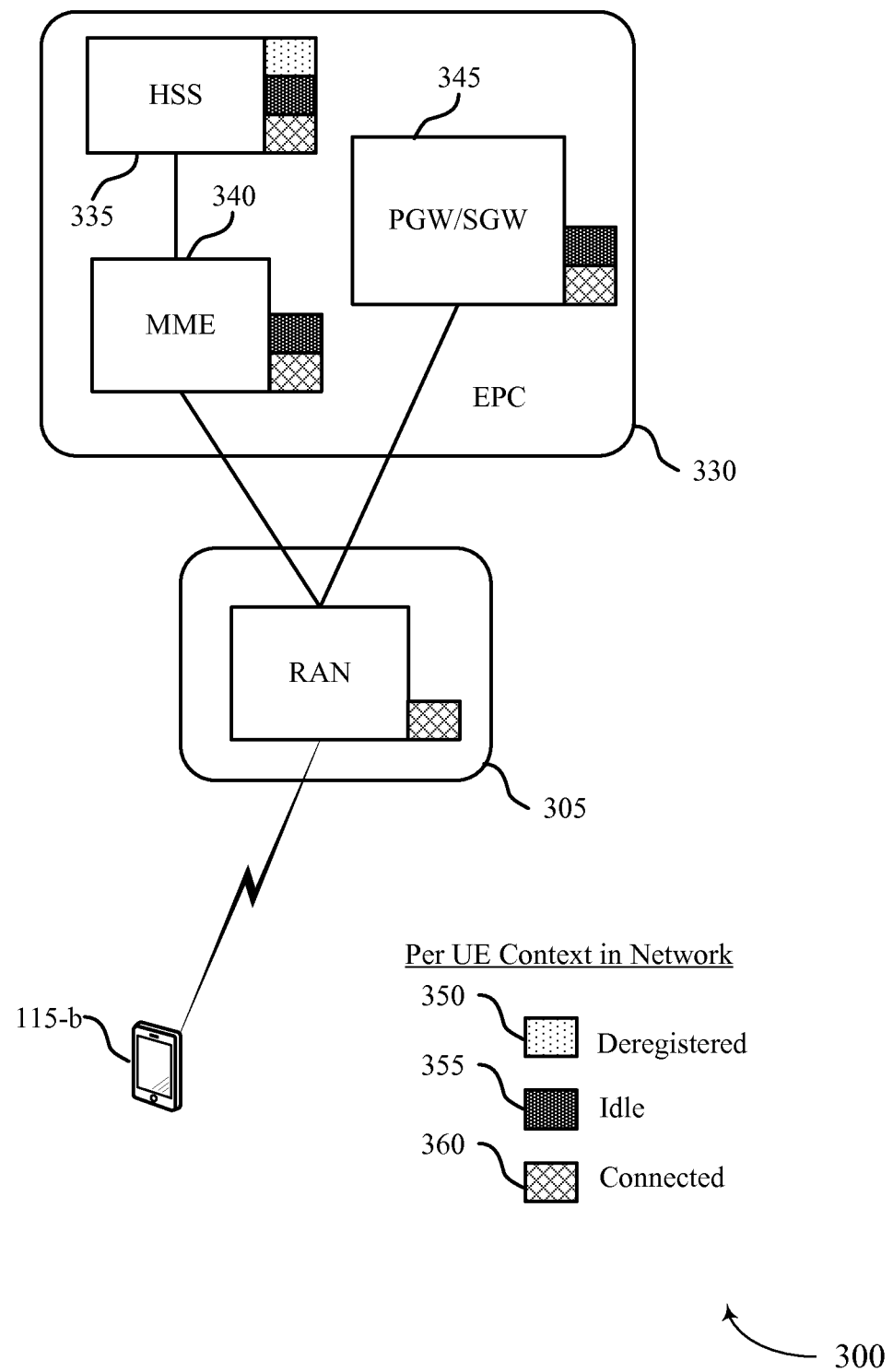
FIG. 3 illustrates an example of a wireless communications system configured for managing UE subscription establishment.

FIG. 3 illustrates an example of a wireless communications system 300 configured for managing user equipment subscription establishment. The system 300 may be an example of an LTE system having aspects of systems 100 and 200 described with reference to FIGS. 1, 2A, and 2B. The system 300 may include a radio-access network (RAN) 305 and evolved packet core (EPC) 330; and the system 300 may be an example of an evolved packet system (EPS). The RAN 305 may include one or several base stations 105, as described in the preceding figures. It will be recognized that the present techniques are not limited to a particular radio access technology or network architecture.

The EPC 330 may be an example of the core networks 130 of FIG. 1, and it may be configured with logical nodes, including a home subscriber service (HSS) 335, a mobility management entity (MME) 340, and a packet data network gateway and serving gateway (PGW/SGW) 345. The interface between the EPC 330 and the UE 115-*b* may be referred to as the non-access stratum (NAS); the UE 115-*b* and the EPC 330 may each include NAS layers. While the interface between the UE 115-*b* and the RAN 305 may be referred to as the access stratum (AS); the UE 115-*b* and the RAN 305 (or base stations 105 within the RAN 305) may include AS layers. The NAS and AS layers of the UE 115-*b* may perform the functions mentioned above and discussed in further detail below.

The HSS 335 may be a database that stores subscriber information about UEs 115. The MME 340 may be a control-plane node configured to manage various connections with the UEs 115. The PGW/SGW 345 may facilitate mobility of the UEs 115 between base stations 105 of various radio access technologies (RATs). Additionally, the PGW/SGW 345 may connect the EPC 330 to the internet; and it may facilitate connection of the UEs 115 to the internet.

The UE 115-*b* may be in one of several states related to mobility management and connection management. To facilitate use of local subscription procedures, an unsubscribed state may be added in which the access network has no subscription information for the UE 115-*b*. This is different from a deregistered state in which context information for the UE 115-*b* may be available. For example, the context information may be retrieved from an HPLMN. Thus, according to the present disclosure, the UE 115-*b* may be in an unsubscribed state, a deregistered state 350 or a registered state, which may include two sub-states: idle state 355 and connected state 360. As indicated in FIG. 3, various aspects (e.g., nodes) of the system maintain context information (e.g., network parameters, bearer information, etc.) of the UE 115-*b* depending on the state.

When the UE 115-*b* is in a deregistered stated 350, the HSS 335 stores UE context information; but the EPC 330 and the RAN 305 do not maintain location or routing information about the UE 115-*b*. The UE 115-*b* in deregistered state 350 may thus be unreachable by the RAN 305 and/or the EPC 330. In some examples, the UE 115-*b* may be able to access services from network 300 utilizing a roaming subscription.

The UE 115-*b* may enter a registered state (e.g., idle 355 or connected 360) with the EPC 330 and RAN 305 upon a successful registration procedure. In a registered state (either idle 355 or active 360), the UE 115-*b* may maintain at least one active packet data network (PDN) connection—e.g., via the PGW/SGW 345. In some examples, when the UE 115-*b* is in a connected state 360, the UE's 115-*b* location may be known in the MME 340. Additionally, each of the HSS 335, the PGW/SGW 345 and the RAN 305 may maintain context information about the UE 115-*b*.

When the UE 115-*b* is in an idle state 355, the UE 115-*b* may operate without an NAS signaling connection to the EPC 330. Additionally, the RAN 305 may be without context information for the UE 115-*b* in an idle state 355. The UE 115-*b* may, however, maintain a signaling connection with the MME 340 (e.g., an RRC connection and/or an S1 connection). In some examples, the HSS 335, MME 340, and the PGW/SGW 345 maintain context information for the UE 115-*b* while it is in an idle state 355.

When the UE 115-*b* is in an unsubscribed state, it may be unreachable by the RAN 305 or the EPC 330. Thus, in some examples, the HSS 335 does not maintain or store context information about unsubscribed UEs 115, and the EPC 330 is without subscription information about the UE 115-*b*. The unsubscribed state does, however, allow the UE 115-*b* to establish a local subscription with EPC 330 such that, in some examples, the UE 115-*b* may enter a deregistered state 350 with the EPC 330 of a non-home network. Unlike a roaming scenario, a UE 115-*b* in an unsubscribed state may establish a local subscription without regard to whether it has a home subscription with a different network.

In some examples, the UE 115-*b* may enter an unsubscribed state upon determining that local subscription information is unavailable in a particular access network. The UE 115-*b* may undergo a subscription establishment procedure during which the UE 115-*b* obtains credentials. The UE 115-*b* may then transition to a deregistered state and subsequently camp on the access network utilizing credentials obtained in the subscription establishment procedure.

As mentioned above, a home network operator may control whether, when, and where a particular UE 115 may initiate a local subscription establishment procedure. Accordingly, the home network operator may control whether a UE 115 may operate in an unsubscribed state. This level of operator control may allow network operators to reach mutually beneficial agreements related to local subscriptions, which, in turn, may allow users to access high-speed, wideband cellular networks without paying costly roaming fees. In other words, the introduction of the unsubscribed state for UEs 115 may provide a workable alternative to roaming, which may incentivize operators to reach beneficial agreements on behalf of their users and/or subscribers, and which may allow cellular networks to compete with lower-cost WLAN services.

Network operators may control (e.g., activate or deactivate) unsubscribed operation for a variety of reasons and to accomplish different ends. In some examples, a network operator may determine PLMNs at which a UE 115 may establish a connection as an unsubscribed (as opposed to a deregistered) device. An operator may prohibit or allow use of the unsubscribed state. For instance, an operator may want to configure the UE 115 to not be able to establish a connection with another PLMN as unsubscribed. An operator may seek to prohibit local subscription establishment within the coverage area of an HPLMN (e.g., within national boundaries), or the operator may wish to prohibit the device from using local subscription establishment within certain regions (e.g., where certain PLMNs are available based on roaming agreements). Alternatively, an operator may want to allow the device to only be able to establish a connection with another PLMN as unsubscribed. For example, the operator may allow local subscription establishment in certain regions, or when certain PLMNs are available based on roaming agreements.

In various examples, an operator and/or a user may deactivate a UE's 115 use of the unsubscribed state. Additionally, a UE 115 may automatically transition from the unsubscribed state. For example, when a user manually selects a PLMN to connect to in the unsubscribed state, the following may occur. The UE 115 may enter into a manual PLMN selection state. The UE 115 may attempt to register to a selected PLMN as an unsubscribed UE; although the selected PLMN may not be stored as a last registered PLMN (RPLMN). Then, when the UE 115 is no longer within the coverage area of the selected PLMN, the UE 115 may return to a previous (e.g., automatic) PLMN selection state. In the automatic PLMN selection state, the UE 115 may utilize stored RPLMN credentials to establish connections.

Figure 4:
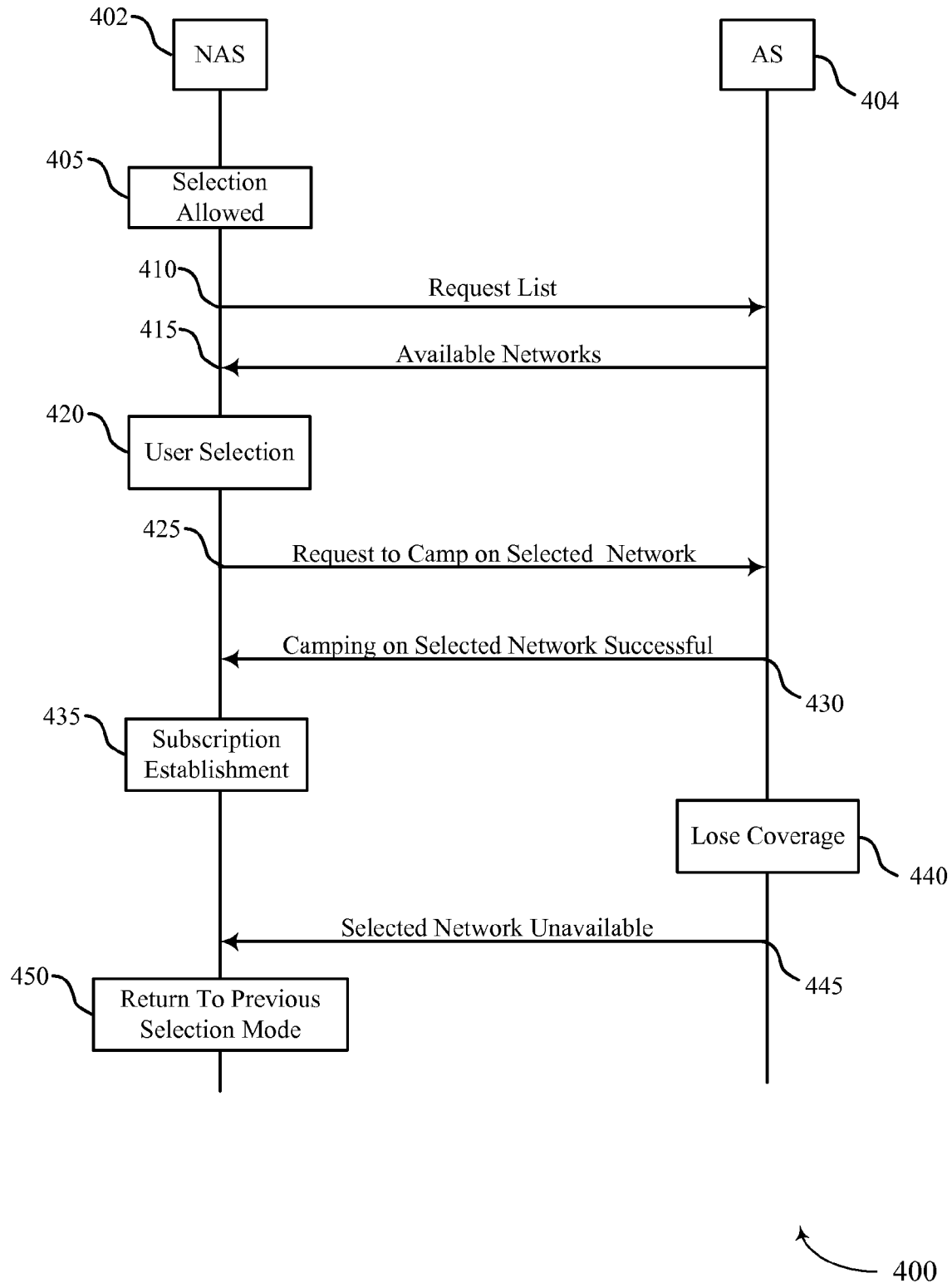
FIG. 4 is a call flow diagram that illustrates an example of UE subscription establishment management.

Turning next to FIG. 4, shown is a call flow diagram 400 that illustrates an example of UE subscription establishment management. The diagram includes a NAS layer 402 and an AS layer 404 which may be logical layers of a UE 115 (e.g., a UE 115 in the preceding FIGS.) protocol stack; and which may perform the functions discussed above.

At block 405, a UE 115 may determine whether it may operate in an unsubscribed state, and whether it may initiate a local subscription establishment procedure with a non-home access network. In some examples, initiating a local subscription establishment procedure is referred to as unsubscribed PLMN selection. A UE 115 may thus determine if unsubscribed PLMN selection is allowed based on, for instance, an unsubscribed PLMN selection flag (e.g., a flag and/or USIM indication as discussed above). This flag may be an information element (IE) stored in the USIM and updated according to appropriate standards. Additionally or alternatively, the UE 115 may determine if unsubscribed PLMN selection is allowed based on its current location, the time of day, the absence of other available coverage, and/or the applications currently active on the UE 115; these or other conditions may be indicated by the USIM.

When the UE 115 determines that it may initiate a local subscription establishment procedure, the NAS layer 402, may request a list of available access networks (e.g., PLMNs) from the AS layer 404 with message 410. In some cases, a user of the UE 115 may request and/or activate an unsubscribed PLMN selection operation, which triggers the NAS layer 402 to request a list of available PLMNs from which to choose for a local subscription establishment. The UE 115 may be configured such that the UE 115 may only be able to initiate a local subscription establishment procedure (e.g., unsubscribed PLMN selection) if the UE 115 is not presently connected with another access network.

In response to the NAS layer 402 request, the AS layer 404 may scan all RF channels according to the UE's 115 capabilities—e.g., utilizing a cell selection procedure discussed above. And the AS layer 404 may return a list of available access networks (e.g., PLMNs) with message 415.

The UE 115 may display information about available access networks to a user of the UE 115. For instance, the UE 115 may display to the user a list of available PLMNs. In some examples, the UE 115 may receive an input from the user to display the information about available access networks, and the input may prompt the UE 115 to display the information. In some examples, a user's home access network (e.g., HPLMN) operator may configure and/or otherwise control the access networks at which the UE 115 is allowed to establish a local subscription. The user's home access network operator may thus control (e.g., restrict) whether the UE 115 is allowed to display available access networks conveyed in the message 415 utilizing, for example, a forbidden list or an allowed list. A forbidden list may be a list of access networks from which a user is not allowed to select for connection; an access network excluded from the forbidden list may thus be available to the UE 115. An empty forbidden list may be used to indicate that the UE 115 is allowed to access any available access network as an unsubscribed UE. An allowed list may be a list of access networks from which a user is allowed to select for connection. An empty allowed list may be used to indicate that the UE 115 is forbidden to access any available access network as an unsubscribed UE. The forbidden and/or allowed lists may be IEs stored in the USIM and updated according to appropriate standards. In some examples, such as when a home access network operator has not configured a UE 115, the UE 115 may default to provide (e.g., display), without restriction, all available access networks returned in the message 415.

At block 420, the user of the UE 115 may select an access network from among those displayed by the UE 115. The UE 115 may thus receive an input from the user, and the input may be indicative of an access network at which to initiate the subscription establishment procedure. In some examples, the selected access network includes a non-operator controlled access point—e.g., an access point referred to by those skilled in the art as a "Hot Spot."

In some examples, the list of available access networks may include the user's home access network, in addition to other access networks (e.g., HPLMN and VPLMNs). If the user and/or UE 115 selects the home access network for connection, the UE 115 may decide whether to attach to the access network in an unsubscribed state and, for example, initiate a new home subscription, or to attach in a deregistered state. In some cases, the UE 115 requests user input to make such a decision. For instance, the UE 115 may display to the user an indication that credentials exist at the home access network, and the UE 115 may query the user whether to create new credentials. If the user elects to create new credentials, the UE 115 may attach to the home access network in an unsubscribed state; if the user elects not to create new credentials, the UE 115 may attach to the home access network in a deregistered state.

The NAS layer 404 may then request, with message 425, the AS layer 404 to undertake procedures (e.g., cell selection procedures) to camp on a selected access network. The selected access network may be the access network manually selected via a user input. The AS layer 404 may then undertake the procedure (e.g., cell selection procedure) necessary to camp on the best cell in the selected access network. For example, the UE 115 may search for an acceptable or suitable cell (e.g., base station 105 of FIGS. 1, 2A, 2B) belonging to the selected access network. The AS layer 404 may then return, via message 430, an indication that camping on the selected access network was successful.

At block 435, the UE 115, operating in an unsubscribed state, may initiate a local subscription establishment procedure with the selected access network. The local subscription establishment procedure may be referred to as an unsubscribed PLMN registration procedure, a modified attach procedure, and/or a new registration procedure. During this local subscription establishment procedure, the UE 115 may establish a subscription (e.g., credentials) at the selected access network. In some examples, initiating the subscription establishment procedure includes establishing a session with a provisioning server. Additionally or alternatively, initiating the subscription establishment procedure may include transmitting a connection establishment request via the selected access network, and the connection establishment request may be indicative of a desired provisioning server within the access network. The UE 115 may transition from the unsubscribed state to a deregistered state upon completing the subscription establishment procedure.

In some examples, the UE 115 may store subscription information to utilize for subsequent connections with access networks, including home access networks and non-home access networks (e.g., RPLMN). For instance, if a user establishes or attempts to establish a local subscription, then the UE 115 may store a duplicate of the RPLMN credentials and a duplicate of the current PLMN selection of the UE 115 for the home or roaming subscription. In addition, the UE 115 may enter a manual mode for access network selection in order to avoid automatically returning to the home or roaming subscription. For example, and as discussed above, the UE 115 may display a list of available networks to the user, from which a user may select a preferred network at which to establish a local subscription. If a registration attempt at a user-selected PLMN fails, the UE 115 may return to the use of the home or roaming subscription stored based on the stored information related to the home or roaming subscription, such as duplicate PLMN selection mode (e.g., an automatic selection mode); and the UE 115 may utilize the stored duplicate value of the RPLMN and initiate procedures to reselect a cell on the appropriate PLMN, including registering on the PLMN.

After establishing a local subscription with the selected access network, the UE 115 may transition from an unsubscribed state to a deregistered state, and it may subsequently transition to a registered state. At any point, the UE 115 may lose coverage, at block 440, from the selected access network. This coverage loss may be due to mobility or other RF conditions. The AS layer 404 may then inform the NAS layer 402, via message 445, that the selected access network has become unavailable. The UE 115 may then prompt the user to select another network or, in some examples, the UE 115 may, at block 450, return to a previous PLMN selection mode. For instance, the UE 115 may enter an automatic PLMN selection mode.

The UE 115 may initiate another local subscription establishment procedure upon connection or coverage loss of the PLMN (or an equivalent PLMN) associated with the local subscription. Alternatively, the UE 115 may transition to a deregistered state and return to the use of a home or roaming subscription and camp on an access network utilizing stored credentials for the home or roaming subscription. For example, the UE 115 may determine to establish a connection with a different access network (e.g., VPLMN or RPLMN) upon losing a connection with the selected access network. For instance, if the user had previously established local subscription, then when the UE is no longer within the coverage of the PLMN (or an equivalent PLMN) associated with the local subscription, the UE 115 may return to the stored duplicate PLMN selection mode and use the stored duplicate value of RPLMN and initiate the procedures to reselect to a cell on the appropriate PLMN for the home or roaming subscription discussed above.

Figure 5:
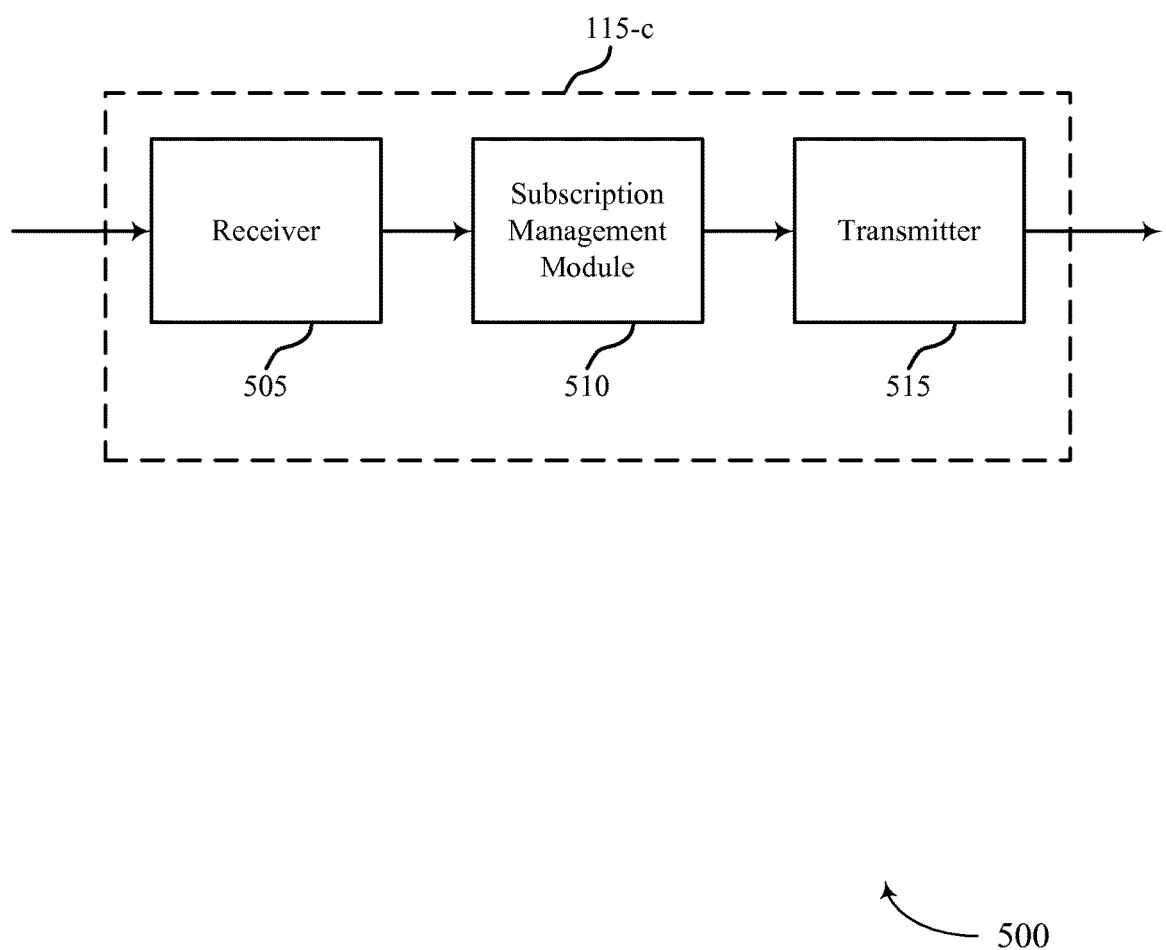
FIG. 5 shows a block diagram of a device configured for managing UE subscription establishment.

Next, FIG. 5 shows a block diagram 500 of a UE 115-c configured for managing subscription establishment. The UE 115-c may be an example of one or more aspects of a UEs 115 described with reference to FIGS. 1-4. The UE 115-c may include a receiver 505, a subscription management module 510, and/or a transmitter 515. The UE 115-c may also include a processor. Each of these components may be in communication with each other.

The receiver 505 may receive information such as packets, user data, and/or control information associated with various information channels (e.g., control channels, data channels, etc.). Information may be passed on to the subscription management module 510, and to other components of the UE 115-c. In some examples, the receiver 505 may be configured to receive credentials for the access network from the provisioning server.

The subscription management module 510 may be configured to identify an access network as a candidate for connection. The subscription management module 510 may be also configured to determine that the UE 115-c is authorized to initiate a local subscription establishment procedure with the access network based, wholly or partially, on the identifying the access network as a candidate. Further, the subscription management module 510 may be configured to initiate the local subscription establishment procedure with the access network, for example, based on the determining that the UE 115-c is authorized to do so.

The transmitter 515 may transmit the one or more signals received from other components of the UE 115-c. In some embodiments, the transmitter 515 may be collocated with the receiver 505 in a transceiver module. The transmitter 515 may include a single antenna, or it may include a plurality of antennas.

Figure 6:
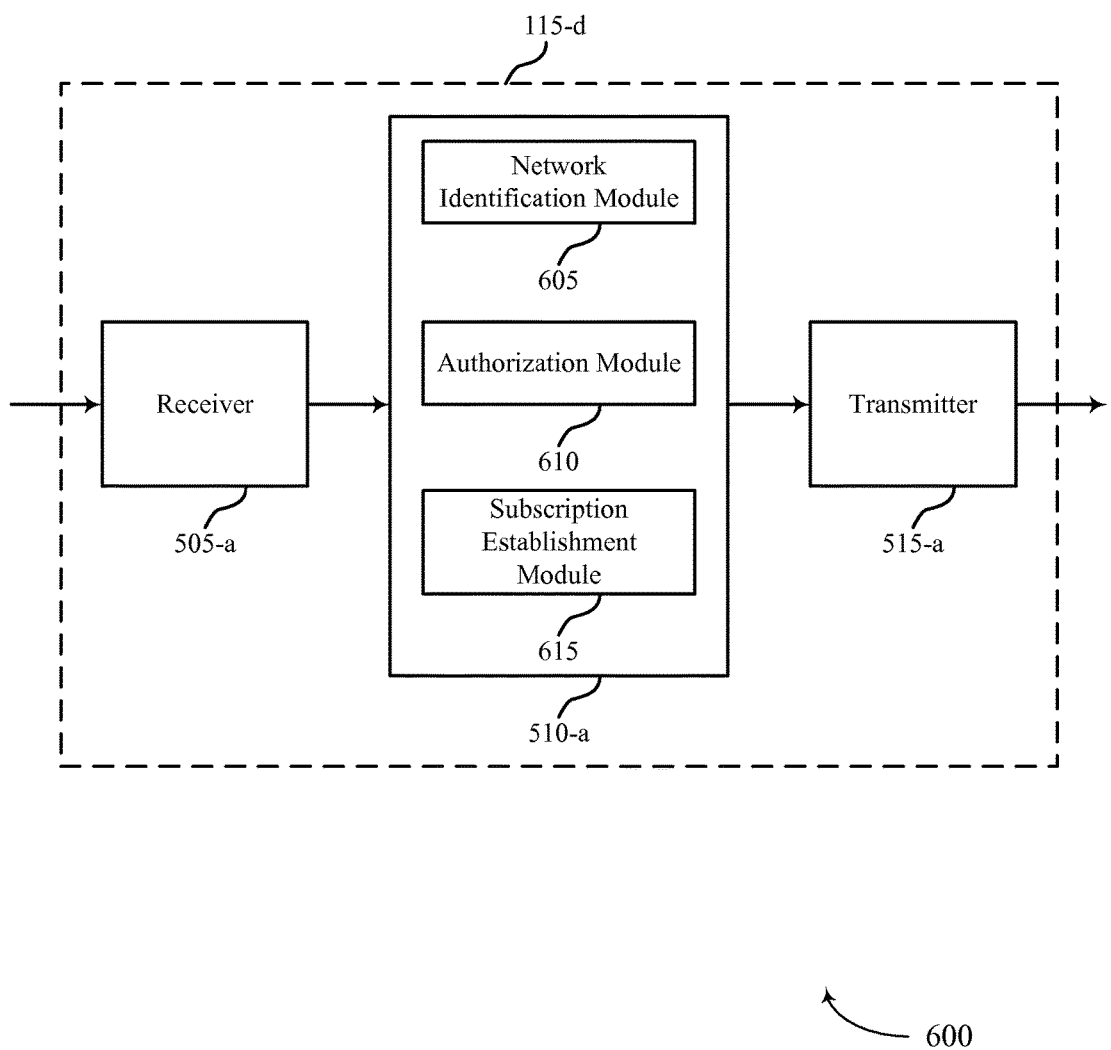
FIG. 6 shows a block diagram of a device configured for managing UE subscription establishment.

FIG. 6 shows a block diagram 600 of a UE 115-d configured for managing subscription establishment. The UE 115-d may be an example of one or more aspects of a UE 115 described with reference to FIGS. 1-5. The UE 115-d may include a receiver 505-a, a subscription management module 510-a, and/or a transmitter 515-a. The UE 115-d may also include a processor. Each of these components may be in communication with one another. The subscription management module 510-a may also include a network identification module 605, an authorization module 610, and a subscription establishment module 615. In some examples, the UE 115-d may be configured to operate in an unsubscribed state.

The receiver 505-a may receive information which may be passed on to the subscription management module 510-a, and to other components of the UE 115-d. The subscription management module 510-a may be configured to perform the operations described above with reference to FIG. 5. The transmitter 515-a may transmit the one or more signals received from other components of the UE 115-d.

The network identification module 605 may be configured to identify an access network as a candidate for connection. In some examples, identifying the access network is based on an access network identifier, such as a PLMN identifier. Additionally or alternatively, identifying the access network may be based on determining that the UE 115-d is within a coverage area of the access network. Identifying the access network may also be based, partially, on determining that the UE 115-d is outside the coverage area of a HPLMN.

The authorization module 610 may be configured to determine that UE 115-d is authorized to initiate a local subscription establishment procedure with the access network, which may be on the network identification module 605 identifying the access network as a candidate. In some examples, the UE 115-d is authorized to establish a connection with the access network utilizing a roaming subscription based on a home subscription, and the authorization module 610 determines that the UE 115-d is authorized to initiate the local subscription establishment procedure with the access network. This may include determining that an access network identifier (e.g., a PLMN identifier) is present in a list of allowed networks. Alternatively, determining that the UE 115-d is authorized to initiate a local subscription establishment procedure with the access network may include determining that the access network identifier is excluded from a list of forbidden networks.

The subscription establishment module 615 may be configured to initiate the local subscription establishment procedure with the access network, for example upon the authorization module determining that such initiation is authorized. In some examples, the UE 115-d initiates the local subscription establishment procedure as an unsubscribed user instead of utilizing the roaming subscription. Initiating the local subscription establishment procedure may include obtaining credentials for accessing the access network. In some examples, obtaining the credentials for accessing the access network may be performed in-band with the access network. Initiating the subscription establishment procedure may also include establishing a session with a provisioning server.

In some examples, the subscription establishment module 615 is configured to control the UE's 115-d transition from the unsubscribed state to a deregistered state, which may occur upon completing the subscription establishment procedure. The subscription establishment module 615 may also be configured to cause the UE 115-d to enter an unsubscribed state upon determining that the local subscription information for the UE 115-d is unavailable at the access network. In some examples, the subscription establishment module 615 is configured to direct the UE 115-d to camp on the access network upon obtaining credentials for the access network through the subscription establishment procedure. Additionally or alternatively, the subscription establishment module 615, in conjunction with the transmitter 515-a, may be configured to initiate the subscription establishment procedure by transmitting a connection establishment request via the access network, and the connection establishment request may be indicative of a desired provisioning server.

Figure 7:
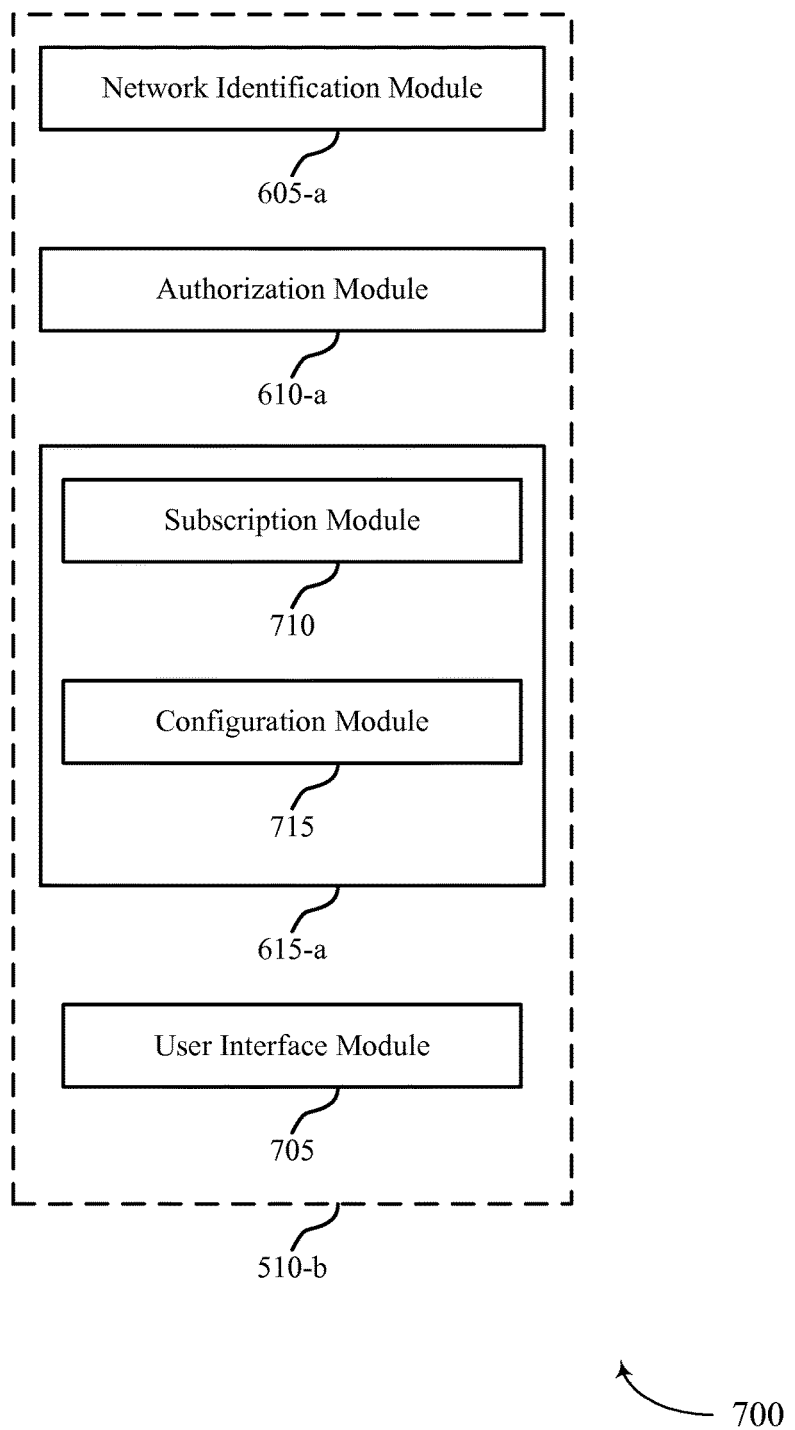
FIG. 7 shows a block diagram of a device configured for managing UE subscription establishment.

Next, FIG. 7 shows a block diagram 700 of a subscription management module 510-b for managing UE subscription establishment. The subscription management module 510-b may be an example of one or more aspects of a subscription management module 510 described with reference to FIGS. 5-6, and may thus illustrate an aspect of a UE 115 described with reference to the preceding figures. The subscription management module 510-b may include a network identification module 605-a, an authorization module 610-a, and a subscription establishment module 615-a. Each of these modules may perform the functions described above with reference to FIG. 6. The subscription management module 510-*b* may also include a user interface module 705, a subscription module 710, and a configuration module 715.

The user interface module 705 may be configured to prompt a user of a UE 115 to choose between initiating the local subscription establishment procedure and establishing a connection as a roaming user—e.g., utilizing a roaming subscription. In some examples, prompting includes displaying an identifier of the access network to the user. The user interface module 705 may also be configured to receive a user input to initiate the local subscription establishment procedure. In some cases, the user interface module 705 is configured to display information about available access networks to a user of the UE 115. The user interface module 705 may also be configured to receive input from the user indicative of an access network at which to initiate the subscription establishment procedure. In some examples, the user interface module 705 is configured to receive input from the user to display the information about available networks.

The subscription module 710 may be configured to store information (e.g., credentials and/or parameters), including duplicate information, associated with various networks. The subscription module 710 may thus store credentials for PLMNs, including an HPLMN, VPLMNs, and/or RPLMNs. The subscription module 710 may also be configured to store information related to PLMN selection mode.

The configuration module 715 may be configured to determine that a UE 115 is permitted to establish the local subscription with the access network based on a configuration of the UE 115. In some examples, the configuration of the UE comprises a flag from the home subscription, which may be indicated to and/or stored in the configuration module 715. In some examples, the configuration of the UE 115 includes at least one of a current location of the UE, a time of day, an absence of other available coverage, or applications currently active on the UE. The configuration module 715 may thus be configured to recognize these or other parameters and to indicate to other modules whether the UE 115 is configured in manner that permits local subscription establishment. In some examples, the configuration includes a management object, which may facilitate establishing the subscription with the access network.

The components of the UE 115-*c*, UE 115-*d*, and/or the subscription establishment modules 510 of FIGS. 5-7 may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another Semi-Custom IC), which may be programmed in any manner known in the art. The functions of each unit may also be implemented, in whole or in part, with instructions embodied in a memory, formatted to be executed by one or more general or application-specific processors.

Figure 8:
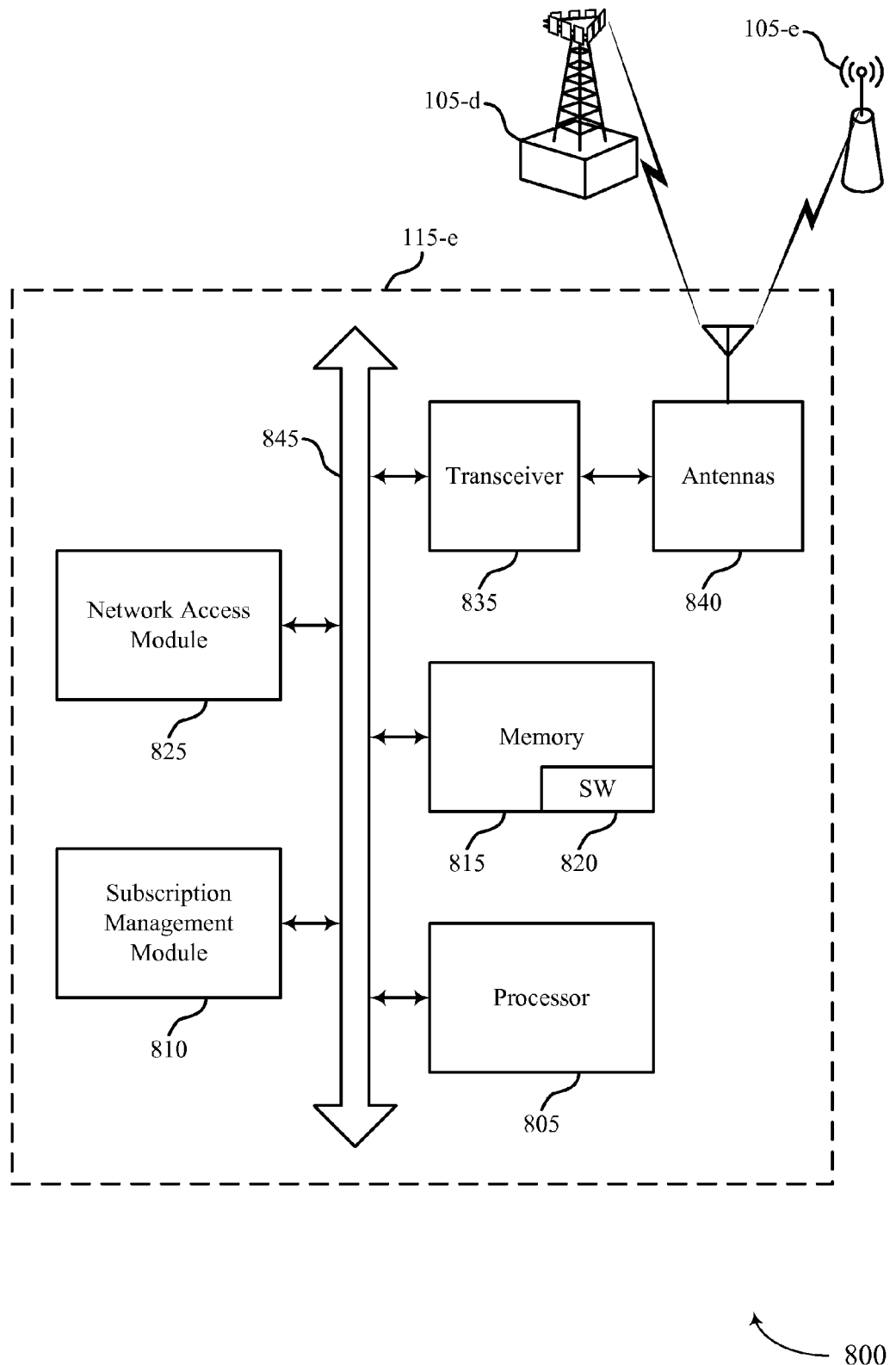
FIG. 8 illustrates an example of a system configured for managing UE subscription establishment.

FIG. 8 shows a diagram of a system 800 configured for managing UE subscription establishment. System 800 may include a UE 115-*e* and/or base stations 105, which may be an example of the UEs 115 and/or base stations 105 described with reference to FIGS. 1-7. The UE 115-*e* may include a subscription management module 810, which may be an example of a subscription management module 510 described with reference to FIGS. 5-7. The UE 115-*e* may also include a network access module 825. In various examples, the UE 115-*e* may include components for bi-directional voice and data communications including components for transmitting communications and components for receiving communications.

The network access module 825 may be configured to determine whether to establish a connection with another network (e.g., VPLMN, RPLMN, etc.) upon losing a connection with the access network. For example, the network access module 825 may be configured to store credentials of VPLMNs, RPLMNs, and/or an HPLMN, and to communicate those credentials to other components of the UE 115-*e*. In some examples, the network access module 825 is configured to store PLMN selection modes.

The UE 115-*e* may also include a processor module 805, and memory 815 (including software (SW)) 820, a transceiver module 835, and one or more antenna(s) 840, which each may communicate, directly or indirectly, with each other (e.g., via one or more buses 845. The transceiver module 835 may be configured to communicate bi-directionally, via the antenna(s) 840 and/or one or more wired or wireless links, with one or more networks, as described above. For example, the transceiver module 835 may be configured to communicate bi-directionally with the base stations 105. The transceiver module 835 may include a modem configured to modulate packets and provide the modulated packets to the antenna(s) 840 for transmission, and to demodulate packets received from the antenna(s) 840. While the UE 115-*e* may include a single antenna 840, the UE 115-*e* may also have multiple antennas 840 capable of concurrently transmitting and/or receiving multiple wireless transmissions. The transceiver module 835 may also be capable of concurrently communicating with one or more base stations 105.

The memory 815 may include random access memory (RAM) and read only memory (ROM). The memory 815 may store computer-readable, computer-executable software/firmware code 820 containing instructions that are configured to, when executed, cause the processor module 805 to perform various functions described herein (e.g., call processing, database management, processing of carrier mode indicators, reporting channel state information (CSI), etc.). Alternatively, the software/firmware code 820 may not be directly executable by the processor module 805 but be configured to cause a computer (e.g., when compiled and executed) to perform functions described herein. The processor module 805 may include an intelligent hardware device, e.g., a central processing unit (CPU), a microcontroller, an ASIC, etc. may include RAM and ROM. The memory 815 may store computer-readable, computer-executable software/firmware code 820 containing instructions that are configured to, when executed, cause the processor module 805 to perform various functions described herein (e.g., UE subscription management). Alternatively, the software/firmware code 820 may not be directly executable by the processor module 805 but be configured to cause a computer (e.g., when compiled and executed) to perform functions described herein. The processor module 805 may include an intelligent hardware device, e.g., a CPU, a microcontroller, an ASIC, etc.

According to the architecture of the UE 115-*e*, the network access module 825 and/or the subscription management module 810 may be individual components or modules in communication with other modules of the UE 115-*e* via one or more buses 845. Alternatively, the functionality of the network access module 825 and/or the subscription management module 810 may be embodied as instructions stored in the memory 815 (or SW 820) executed by the processor 805.

Figure 9:
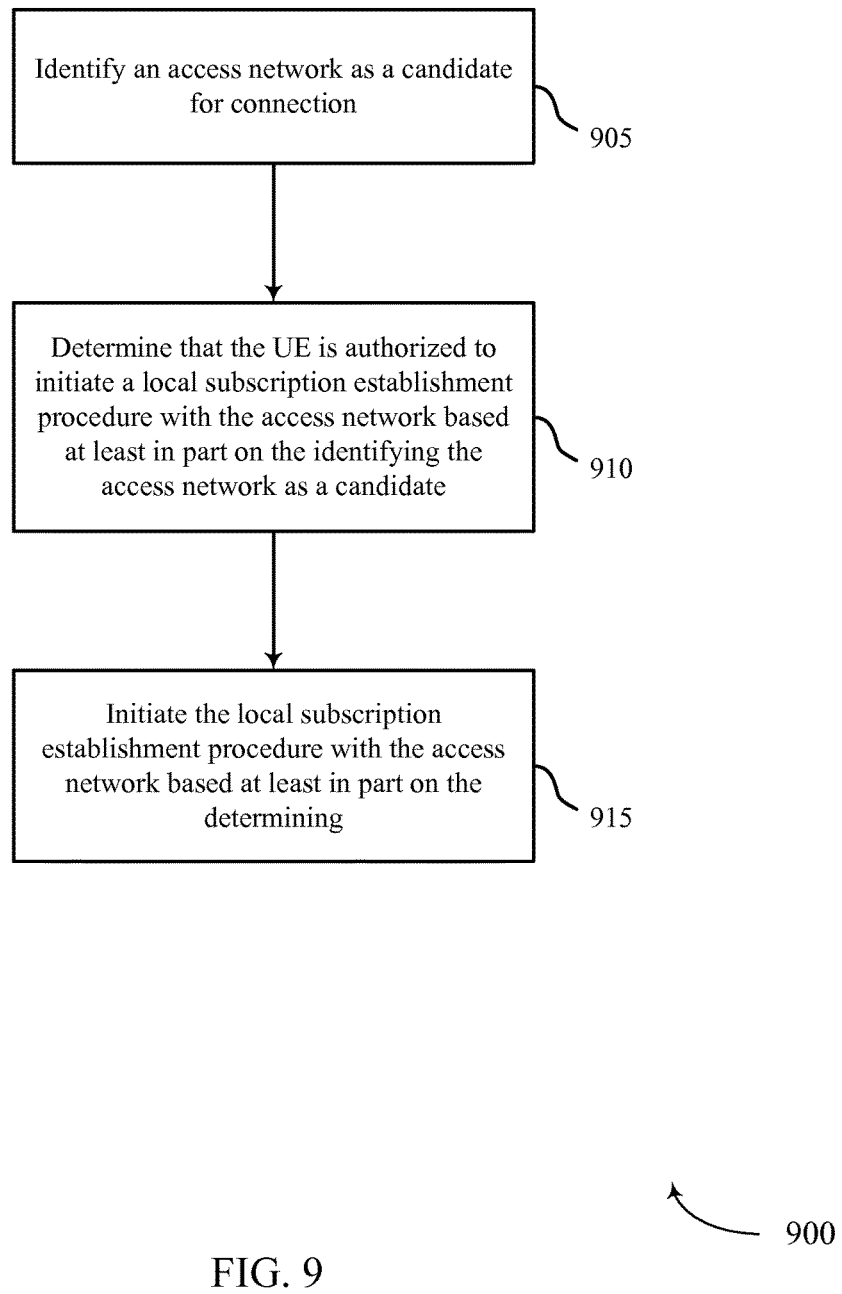
FIG. 9 shows a flowchart illustrating a method for managing UE subscription establishment.

Next, FIG. 9 shows a flowchart 900 illustrating a method for managing UE subscription establishment. The functions of flowchart 900 may be implemented by a UE 115 or its components as described with reference to FIGS. 1-8. In certain examples, the blocks of the flowchart 900 may be performed by the subscription management module 510, 810 described with reference to FIGS. 5-8.

At block 905, the UE 115 may identify an access network as a candidate for connection. In certain examples, the functions of block 905 may be performed by the network identification module 605 as described above with reference to FIG. 6.

At block 910, the UE 115 may determine that the UE 115 is authorized to initiate a local subscription establishment procedure with the access network based at least in part on the identifying the access network as a candidate. In certain examples, the functions of block 910 may be performed by the authorization module 610 as described above with reference to FIG. 6.

At block 915, the UE 115 may initiate the local subscription establishment procedure with the access network based at least in part on the determining. In certain examples, the functions of block 915 may be performed by the subscription establishment module 615 as described above with reference to FIG. 6.

Figure 10:
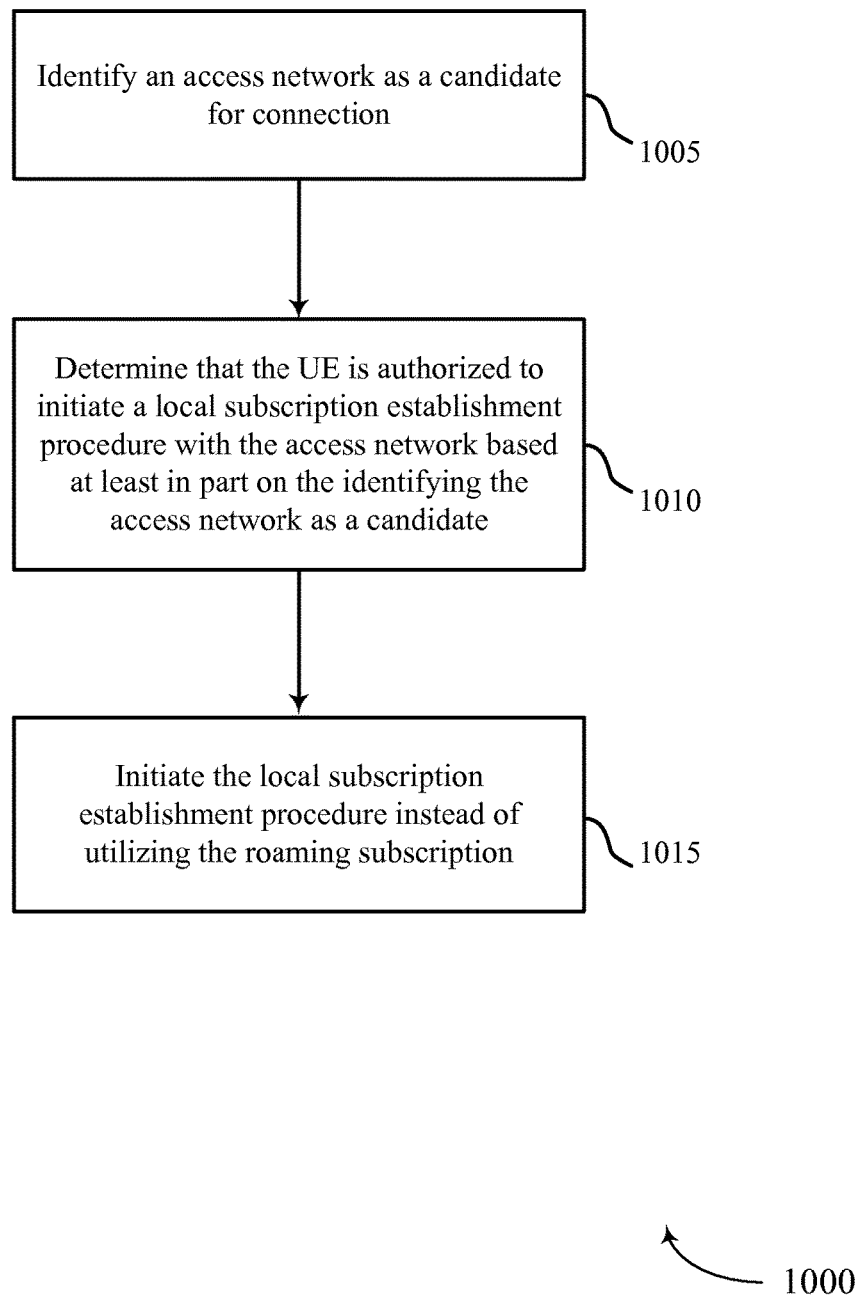
FIG. 10 shows a flowchart illustrating a method for managing UE subscription establishment.

FIG. 10 shows a flowchart 1000 illustrating a method for managing UE subscription establishment. The functions of flowchart 1000 may be implemented by a UE 115 or its components as described with reference to FIGS. 1-8. In certain examples, the blocks of the flowchart 1000 may be performed by the subscription management module 510, 810 described with reference to FIGS. 5-8. The method described in flowchart 1000 may be an example of the method described in flowchart 900 of FIG. 9.

At block 1005, the UE 115 may identify an access network as a candidate for connection. In certain examples, the functions of block 1005 may be performed by the network identification module 605 as described above with reference to FIG. 6.

At block 1010, the UE 115 may determine that the UE 115 is authorized to initiate a local subscription establishment procedure with the access network based at least in part on identifying the access network as a candidate. In certain examples, the functions of block 1010 may be performed by the authorization module 610 as described above with reference to FIG. 6.

At block 1015, the UE 115 may the UE initiates the local subscription establishment procedure instead of establishing a connection as a roaming user. In such cases, the UE 115 may be authorized to establish a connection with the access network utilizing a roaming subscription based on a home subscription. The UE 115 may initiate the local subscription establishment procedure with the access network based at least in part on determining that local subscription establishment is authorized. In certain examples, the functions of block 1015 may be performed by the subscription establishment module 615 as described above with reference to FIG. 6.

Figure 11:
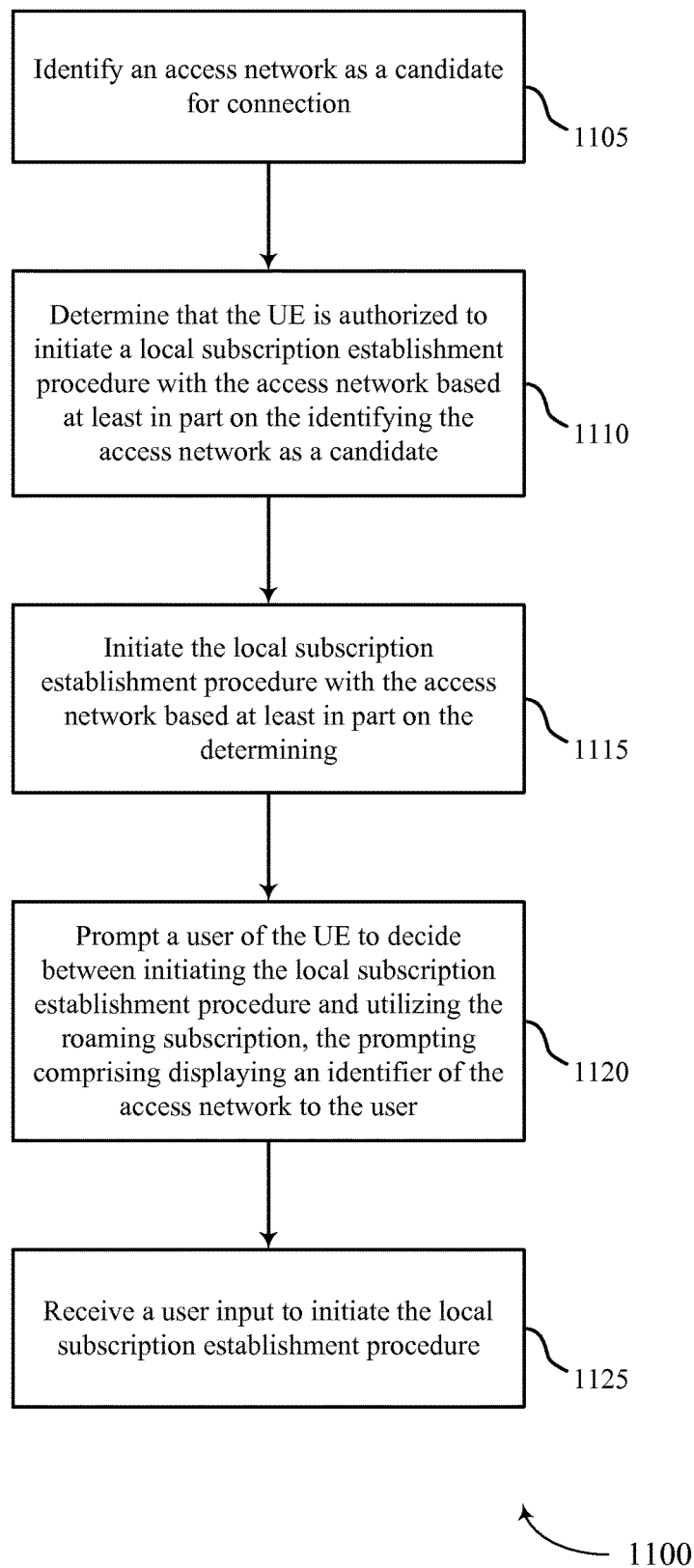
FIG. 11 shows a flowchart illustrating a method for managing UE subscription establishment.

FIG. 11 shows a flowchart 1100 illustrating a method for managing UE subscription establishment. The functions of flowchart 1100 may be implemented by a UE 115 or its components as described with reference to FIGS. 1-8. In certain examples, the blocks of the flowchart 1100 may be performed by the subscription management module 510, 810 described with reference to FIGS. 5-8. The method described in flowchart 1100 may also be examples of the methods shown in flowcharts 900 and 1000 of FIGS. 9-10.

At block 1105, the UE 115 may identify an access network as a candidate for connection. In certain examples, the functions of block 1105 may be performed by the network identification module 605 as described above with reference to FIG. 6.

At block 1110, the UE 115 may determine that the UE 115 is authorized to initiate a local subscription establishment procedure with the access network based at least in part on the identifying the access network as a candidate. In certain examples, the functions of block 1110 may be performed by the authorization module 610 as described above with reference to FIG. 6.

At block 1115, the UE 115 may initiate the local subscription establishment procedure with the access network based at least in part on determining that it is authorized to do so. In certain examples, the functions of block 1115 may be performed by the subscription establishment module 615 as described above with reference to FIG. 6.

At block 1120, the UE 115 may prompt a user of the UE 115 to choose between initiating the local subscription establishment procedure and utilizing the roaming subscription. The prompting may include displaying an identifier of the access network to the user. In certain examples, the functions of block 1120 may be performed by the user interface module 705 as described above with reference to FIG. 7.

At block 1125, the UE 115 may receive a user input to initiate the local subscription establishment procedure. In certain examples, the functions of block 1125 may be performed by the user interface module 705 as described above with reference to FIG. 7.

Figure 12:
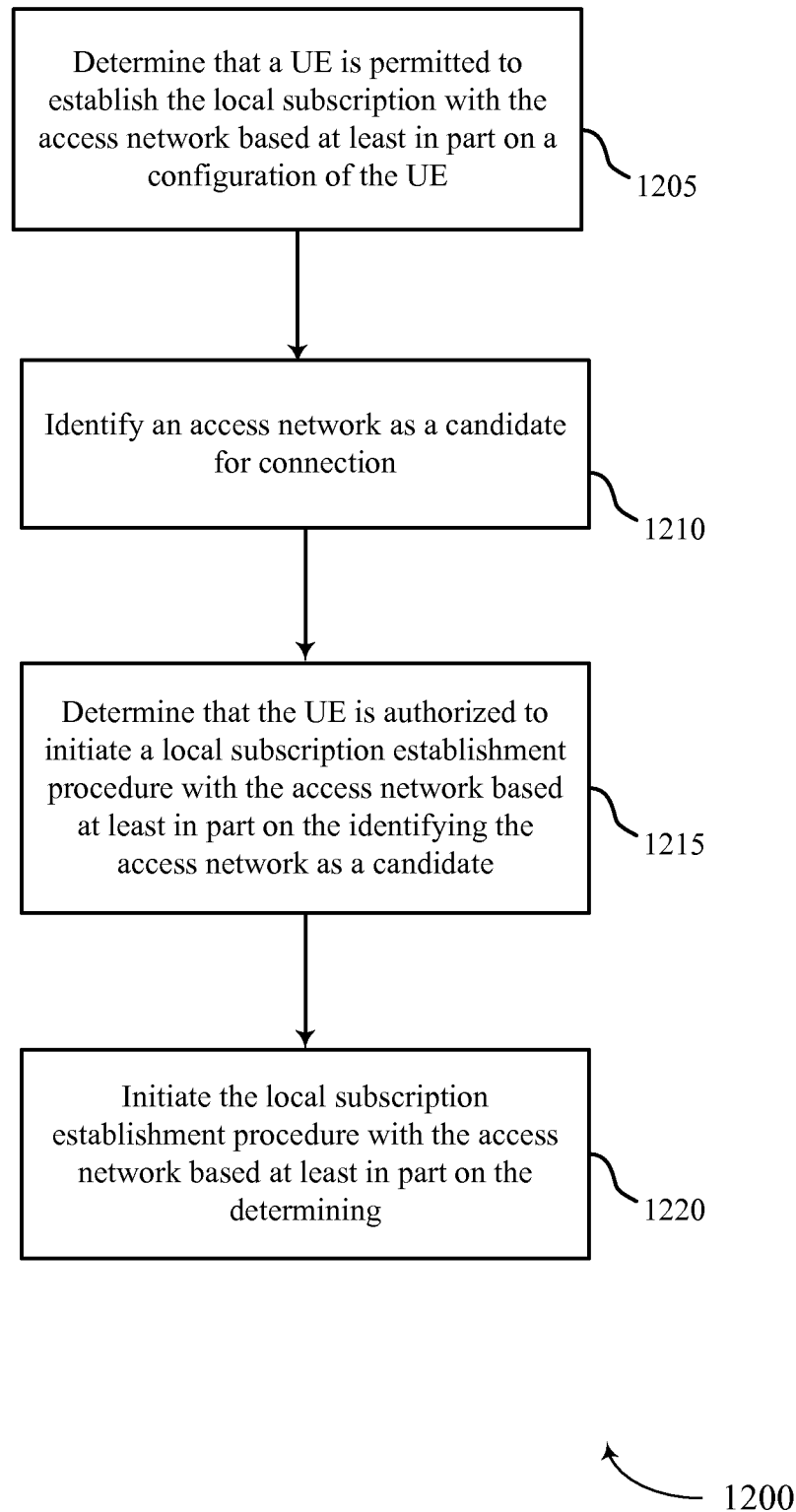
FIG. 12 shows a flowchart illustrating a method for managing UE subscription establishment.

FIG. 12 shows a flowchart 1200 illustrating a method for managing UE subscription establishment. The functions of flowchart 1200 may be implemented by a UE 115 or its components as described with reference to FIGS. 1-8. In certain examples, the blocks of the flowchart 1200 may be performed by the subscription management module 510, 810 as described with reference to FIGS. 5-8. The method described in flowchart 1200 may also examples of the methods described in flowcharts 900-1100 of FIGS. 9-11.

At block 1205, the UE 115 may determine that it is permitted to establish the local subscription with the access network based at least in part on a configuration of the UE 115. In certain examples, the functions of block 1205 may be performed by the configuration module 715 as described above with reference to FIG. 7.

At block 1210, the UE 115 may identify an access network as a candidate for connection. In certain examples, the functions of block 1210 may be performed by the network identification module 605 as described above with reference to FIG. 6.

At block 1215, the UE 115 may determine that it is authorized to initiate a local subscription establishment procedure with the access network based at least in part on the identifying the access network as a candidate. In certain examples, the functions of block 1215 may be performed by the authorization module 610 as described above with reference to FIG. 6.

At block 1220, the UE 115 may initiate the local subscription establishment procedure with the access network based at least in part on the determining that it is authorized to do so. In certain examples, the functions of block 1220 may be performed by the subscription establishment module 615 as described above with reference to FIG. 6.

Figure 13:
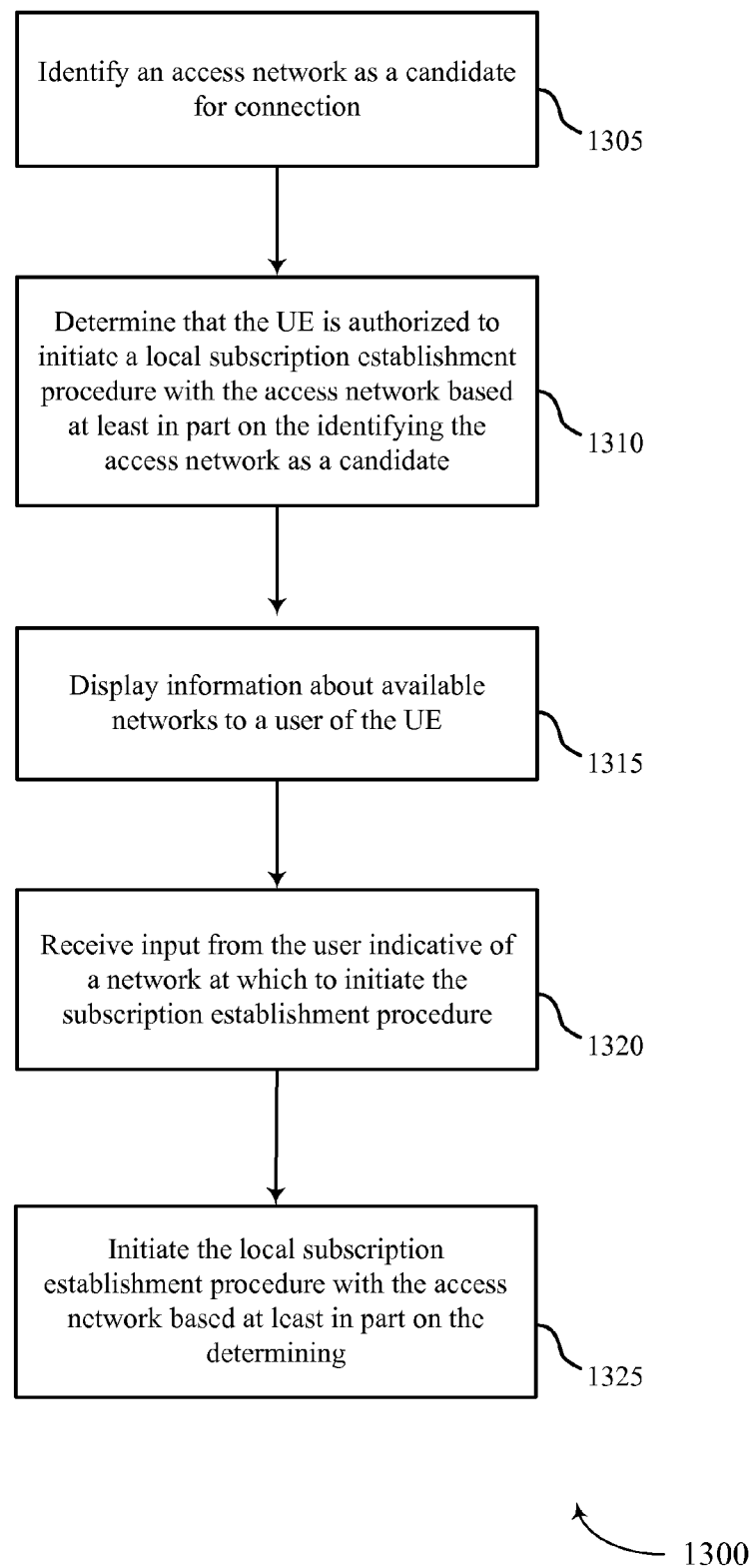
FIG. 13 shows a flowchart illustrating a method for managing UE subscription establishment.

FIG. 13 shows a flowchart 1300 illustrating a method for managing UE subscription establishment in accordance with various embodiments. The functions of flowchart 1300 may be implemented by a UE 115 or its components as described with reference to FIGS. 1-8. In certain examples, the blocks of the flowchart 1300 may be performed by the subscription management module 510, 810 described with reference to FIGS. 5-8. The method described in flowchart 1300 may also be an example of the method described in flowcharts 900-1200 of FIGS. 9-12.

At block 1305, the UE 115 may identify an access network as a candidate for connection. In certain examples, the functions of block 1305 may be performed by the network identification module 605 as described above with reference to FIG. 6.

At block 1310, the UE 115 may determine that the UE 115 is authorized to initiate a local subscription establishment procedure with the access network based at least in part on the identifying the access network as a candidate. In certain examples, the functions of block 1310 may be performed by the authorization module 610 as described above with reference to FIG. 6.

At block 1315, the UE 115 may display information about available networks to a user of the UE. In certain examples, the functions of block 1315 may be performed by the user interface module 705 as described above with reference to FIG. 7.

At block 1320, the UE 115 may receive input from the user indicative of an access network at which to initiate the subscription establishment procedure. In certain examples, the functions of block 1320 may be performed by the user interface module 705 as described above with reference to FIG. 7.

At block 1325, the UE 115 may initiate the local subscription establishment procedure with the access network based at least in part on determining that it is authorized to dos so and, in some examples, on the user input. In certain examples, the functions of block 1325 may be performed by the subscription establishment module 615 as described above with reference to FIG. 6.

Figure 14:
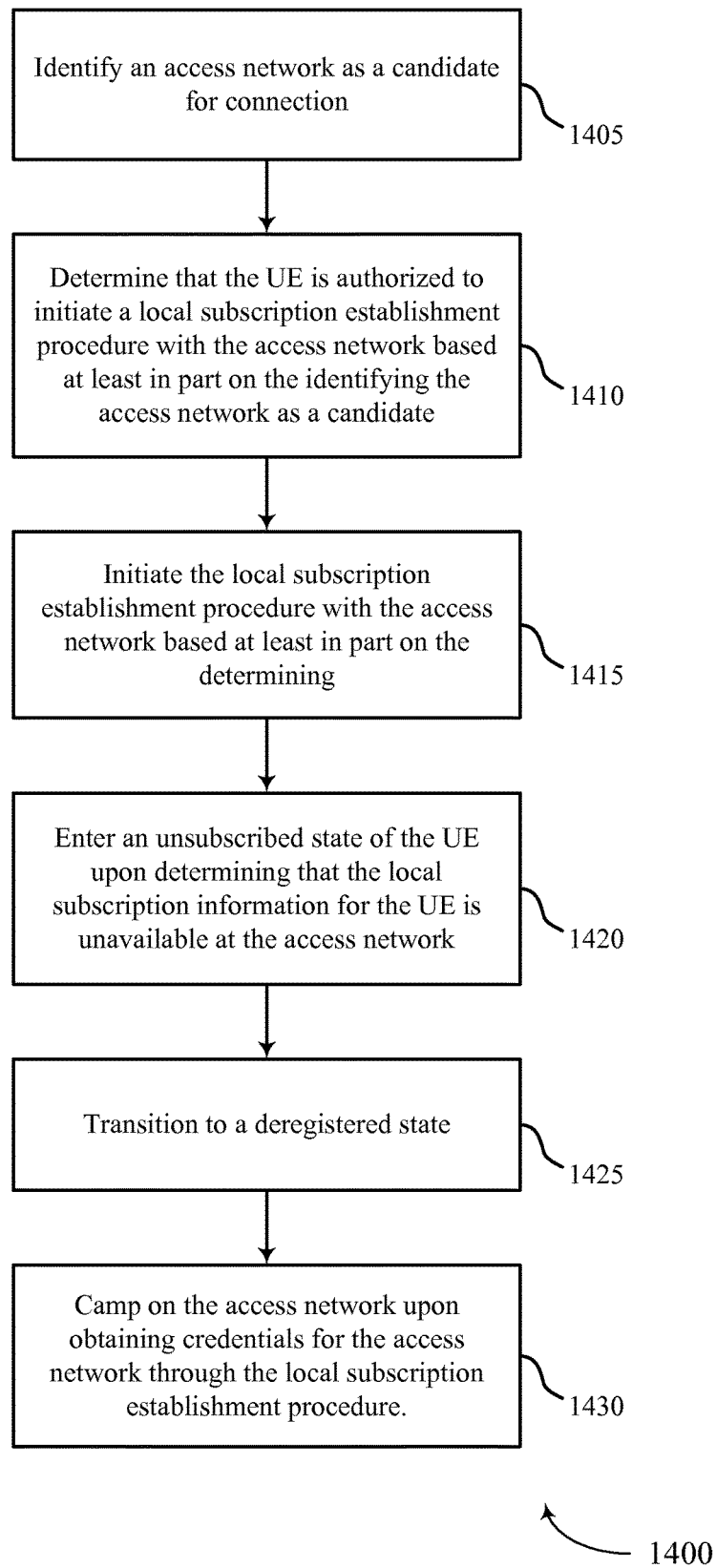
FIG. 14 shows a flowchart illustrating a method for managing UE subscription establishment.

FIG. 14 shows a flowchart 1400 illustrating a method for managing UE subscription establishment in accordance with various embodiments. The functions of flowchart 1400 may be implemented by a UE 115 or its components as described with reference to FIGS. 1-8. In certain examples, the blocks of the flowchart 1400 may be performed by the subscription management module 510, 810 described with reference to FIGS. 5-8. The method described in flowchart 1400 may also be an example of the methods described in flowcharts 900-1300 of FIGS. 9-13.

At block 1405, the UE 115 may identify an access network as a candidate for connection. In certain examples, the functions of block 1405 may be performed by the network identification module 605 as described above with reference to FIG. 6.

At block 1410, the UE 115 may determine that the UE 115 is authorized to initiate a local subscription establishment procedure with the access network based at least in part on the identifying the access network as a candidate. In certain examples, the functions of block 1410 may be performed by the authorization module 610 as described above with reference to FIG. 6.

At block 1415, the UE 115 may initiate the local subscription establishment procedure with the access network based at least in part on the determining that it is authorized to do so. In certain examples, the functions of block 1415 may be performed by the subscription establishment module 615 as described above with reference to FIG. 6.

At block 1420, the UE 115 may enter an unsubscribed state of the UE upon determining that the local subscription information for the UE is unavailable at the access network. In certain examples, the functions of block 1420 may be performed by the subscription establishment module 615 as described above with reference to FIG. 6.

At block 1425, the UE 115 may transition to a deregistered state. In certain examples, the functions of block 1425 may be performed by the subscription establishment module 615 as described above with reference to FIG. 6.

At block 1430, the UE 115 may camp on the access network upon obtaining credentials for the access network through the local subscription establishment procedure. In certain examples, the functions of block 1430 may be performed by the subscription establishment module 615 as described above with reference to FIG. 6.

It should be noted that the methods described above and represented in flowchart 900-1400 are just example implementations, and that the operations of these methods, and the steps therein, may be rearranged or otherwise modified such that other implementations are possible.

The detailed description set forth above in connection with the appended drawings describes exemplary embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another, including non-transitory media. A computer-readable storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein, but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication, comprising:
identifying, by a user equipment (UE), an access network as a candidate for connection, wherein the access network is outside of a home public land mobile network (HPLMN) of the UE, and wherein identifying the access network as a candidate for connection comprises:
determining an availability of the access network for a connection by the UE as roaming user or as an unsubscribed user;
determining whether the access network supports a local subscription establishment procedure;
determining that the UE is authorized to initiate the local subscription establishment procedure with the access network; and
establishing, by the UE through the local subscription establishment procedure with the access network, a local subscription based at least in part on determining that the access network supports the local subscription establishment procedure and determining that the UE is authorized to initiate the local subscription establishment procedure, wherein the local subscription is different from a home subscription with the HPLMN.

2. The method of claim 1, further comprising:
prompting a user of the UE to choose between initiating the local subscription establishment procedure or accessing the access network as the roaming user; and
receiving a user input to initiate the local subscription establishment procedure.

3. The method of claim 1, wherein initiating the local subscription establishment procedure comprises:
obtaining credentials for accessing the access network.

4. The method of claim 3, wherein obtaining the credentials for accessing the access network is performed in-band with the access network.

5. The method of claim 1, wherein the access network comprises a public land mobile network (PLMN).

6. The method of claim 1, wherein identifying the access network is based on a PLMN identifier or other access network identifier.

7. The method of claim 6, wherein determining that the UE is authorized to initiate the local subscription establishment procedure with the access network comprises:
determining that the PLMN identifier or other access network identifier is present in a list of allowed networks.

8. The method of claim 6, wherein determining that the UE is authorized to initiate the local subscription establishment procedure with the access network comprises:
   determining that the PLMN identifier or other access network identifier is excluded from a list of forbidden networks.

9. The method of claim 1, wherein identifying the access network is based at least in part on determining that the UE is within a coverage area of the access network.

10. The method of claim 9, wherein identifying the access network is based at least in part on determining that the UE is outside the coverage area of an HPLMN of the UE.

11. The method of claim 1, further comprising:
   determining by the UE that it is permitted to establish a local subscription with the access network based at least in part on a configuration of the UE.

12. The method of claim 11, wherein the configuration of the UE comprises a flag from a home subscription.

13. The method of claim 11, wherein the configuration of the UE comprises restrictions relating to at least one of a current location of the UE, a time of day, an absence of other available coverage, or applications currently active on the UE.

14. The method of claim 11, wherein the configuration of the UE comprises a management object at the UE, and wherein the management object facilitates establishing the local subscription with the access network.

15. The method of claim 1, further comprising:
   displaying information about available networks to a user of the UE; and
   receiving input from the user indicative of an access network at which to initiate the local subscription establishment procedure.

16. The method of claim 15, further comprising:
   receiving input from the user to display the information about available networks.

17. The method of claim 1, wherein initiating the local subscription establishment procedure comprises:
   establishing a session with a provisioning server.

18. The method of claim 17, further comprising:
   receiving credentials for the access network from the provisioning server.

19. The method of claim 1, wherein initiating the local subscription establishment procedure comprises:
   transmitting a connection establishment request via the access network, the connection establishment request indicative of a desired provisioning server.

20. The method of claim 1, wherein initiating the local subscription establishment procedure is performed in an unsubscribed state in which the access network lacks subscription information about the UE.

21. The method of claim 20, further comprising:
   transitioning from the unsubscribed state to a deregistered state upon completing the local subscription establishment procedure.

22. The method of claim 1, further comprising:
   entering an unsubscribed state of the UE upon determining that local subscription information for the UE is unavailable at the access network;
   transitioning to a deregistered state; and
   camping on the access network upon obtaining credentials for the access network through the local subscription establishment procedure.

23. The method of claim 1, further comprising:
   determining to establish a connection with a VPLMN upon losing a connection with the access network.

24. The method of claim 1, wherein the access network comprises a non-operator controlled access point.

25. An apparatus for wireless communication, comprising:
   means for identifying, by a user equipment (UE), an access network as a candidate for connection, wherein the access network is outside of a home public land mobile network (HPLMN) of the UE, and wherein the means for identifying the access network as a candidate for connection comprises:
   means for determining an availability of the access network for a connection by the UE as roaming user or as an unsubscribed user;
   means for determining whether the access network supports a local subscription establishment procedure;
   means for determining that the UE is authorized to initiate the local subscription establishment procedure with the access network; and
   means for establishing, by the UE through the local subscription establishment procedure with the access network, a local subscription based at least in part on determining that the access network supports the local subscription establishment procedure and determining that the UE is authorized to initiate the local subscription establishment procedure, wherein the local subscription is different from a home subscription with the HPLMN.

26. The apparatus of claim 25, further comprising:
   means for prompting a user of the UE to choose between initiating the local subscription establishment procedure or accessing the access network as the roaming user; and
   means for receiving a user input to initiate the local subscription establishment procedure.

27. The apparatus of claim 25, wherein initiating the local subscription establishment procedure comprises:
   obtaining credentials for accessing the access network.

28. The apparatus of claim 27, wherein the means for initiating the local subscription establishment procedure is operable to obtain the credentials for accessing the access network in-band with the access network.

29. The apparatus of claim 25, wherein the access network comprises a public land mobile network (PLMN).

30. The apparatus of claim 25, wherein the means for identifying the access network is operable based on a PLMN identifier or other access network identifier.

31. The apparatus of claim 30, wherein determining that the UE is authorized to initiate the local subscription establishment procedure with the access network comprises:
   determining that the PLMN identifier or other access network identifier is present in a list of allowed networks.

32. The apparatus of claim 30, wherein determining that the UE is authorized to initiate the local subscription establishment procedure with the access network comprises:
   determining that the PLMN identifier or other access network identifier is excluded from a list of forbidden networks.

33. The apparatus of claim 25, wherein the means for identifying the access network is operable based at least in part on determining that the UE is within a coverage area of the access network.

34. The apparatus of claim 33, wherein the means for identifying the access network is operable based at least in part on determining that the UE is outside the coverage area of an HPLMN of the UE.

35. The apparatus of claim 25, further comprising:
means for determining by the UE that it is permitted to establish a local subscription with the access network based at least in part on a configuration of the UE.

36. The apparatus of claim 35, wherein the configuration of the UE comprises a flag from a home subscription.

37. The apparatus of claim 35, wherein the configuration of the UE comprises restrictions relating to at least one of a current location of the UE, a time of day, an absence of other available coverage, or applications currently active on the UE.

38. The apparatus of claim 35, wherein the configuration comprises a management object at the UE, and wherein the management object facilitates establishing the local subscription with the access network.

39. The apparatus of claim 25, further comprising:
means for displaying information about available networks to a user of the UE; and
means for receiving input from the user indicative of an access network at which to initiate the local subscription establishment procedure.

40. The apparatus of claim 39, further comprising:
means for receiving input from the user to display the information about available networks.

41. The apparatus of claim 25, wherein initiating the local subscription establishment procedure comprises:
establishing a session with a provisioning server.

42. The apparatus of claim 41, further comprising:
means for receiving credentials for the access network from the provisioning server.

43. The apparatus of claim 25, wherein initiating the local subscription establishment procedure comprises:
transmitting a connection establishment request via the access network, the connection establishment request indicative of a desired provisioning server.

44. The apparatus of claim 25, wherein the apparatus is operable to initiate the local subscription establishment procedure in an unsubscribed state in which the access network does not have subscription information about the UE.

45. The apparatus of claim 44, further comprising:
means for transitioning from the unsubscribed state to a deregistered state upon completing the local subscription establishment procedure.

46. The apparatus of claim 25, further comprising:
means for entering an unsubscribed state of the UE upon determining that local subscription information for the UE is unavailable at the access network;
means for transitioning to a deregistered state; and
means for camping on the access network upon obtaining credentials for the access network through the local subscription establishment procedure.

47. The apparatus of claim 25, further comprising:
means for determining to establish a connection with a VPLMN upon losing a connection with the access network.

48. The apparatus of claim 25, wherein the access network comprises a non-operator controlled access point.

49. An apparatus for wireless communication, comprising:
A processor;
memory in electronic communication with the processor; and
instructions stored in the memory, the instructions being executable by the processor to cause the apparatus to:
identify, by a user equipment (UE), an access network as a candidate for connection, wherein the access network is outside of a home public land mobile network (HPLMN) of the UE, and wherein the instructions executable by the processor to cause the apparatus to identify the access network as a candidate for connection comprise instructions executable by the processor to cause the apparatus to:
determine an availability of the access network for a connection by the UE as roaming user or as an unsubscribed user;
determine whether the access network supports a local subscription establishment procedure;
determine that the UE is authorized to initiate the local subscription establishment procedure with the access network; and
establish, by the UE through the local subscription establishment procedure with the access network, a local subscription based at least in part on determining that the access network supports the local subscription establishment procedure and determining that the UE is authorized to initiate the local subscription establishment procedure, wherein the local subscription is different from a home subscription with the HPLMN.

50. The apparatus of claim 49, the instructions being further executable by the processor to cause the apparatus to:
prompt a user of the UE to choose between initiating the local subscription establishment procedure or accessing the access network as the roaming user; and
receive a user input to initiate the local subscription establishment procedure.

51. The apparatus of claim 49, the instructions being further executable by the processor to cause the apparatus to:
obtain credentials for accessing the access network to initiate the local subscription establishment procedure.

52. The apparatus of claim 51, the instructions being further executable by the processor to cause the apparatus to:
obtain the credentials for accessing the access network in-band with the access network.

53. The apparatus of claim 49, wherein the access network comprises a public land mobile network (PLMN).

54. The apparatus of claim 49, the instructions being further executable by the processor to cause the apparatus to:
identify the access network based on a PLMN identifier or other access network identifier.

55. The apparatus of claim 54, the instructions being further executable by the processor to cause the apparatus to:
determine that the PLMN identifier or other access network identifier is present in a list of allowed networks.

56. The apparatus of claim 54, the instructions being further executable by the processor to cause the apparatus to:
determine that the PLMN identifier or other access network identifier is excluded from a list of forbidden networks.

57. The apparatus of claim 49, the instructions being further executable by the processor to cause the apparatus to:
identify the access network based at least in part on determining that the UE is within a coverage area of the access network.

58. The apparatus of claim 57, the instructions being further executable by the processor to cause the apparatus to:
identify the access network based at least in part on determining that the UE is outside the coverage area of an HPLMN of the UE.

59. The apparatus of claim 49, the instructions being further executable by the processor to cause the apparatus to:
determine by the UE that it is permitted to establish a local subscription with the access network based at least in part on a configuration of the UE.

60. The apparatus of claim 59, wherein the configuration of the UE comprises a flag from a home subscription.

61. The apparatus of claim 59, wherein the configuration of the UE comprises restrictions relating to at least one of a current location of the UE, a time of day, an absence of other available coverage, or applications currently active on the UE.

62. The apparatus of claim 59, wherein the configuration of the UE comprises a management object at the UE, and wherein the management object facilitates establishing the local subscription with the access network.

63. The apparatus of claim 49, the instructions being further executable by the processor to cause the apparatus to:
display information about available networks to a user of the UE; and
receive input from the user indicative of an access network at which to initiate the local subscription establishment procedure.

64. The apparatus of claim 63, the instructions being further executable by the processor to cause the apparatus to:
receive input from the user to display the information about available networks.

65. The apparatus of claim 49, the instructions being further executable by the processor to cause the apparatus to:
establishing a session with a provisioning server to initiate the local subscription establishment procedure.

66. The apparatus of claim 65, the instructions being further executable by the processor to cause the apparatus to:
receive credentials for the access network from the provisioning server.

67. The apparatus of claim 49, the instructions being further executable by the processor to cause the apparatus to:
transmit a connection establishment request via the access network, the connection establishment request indicative of a desired provisioning server.

68. The apparatus of claim 49, the instructions being further executable by the processor to cause the apparatus to:
initiate the local subscription establishment procedure in an unsubscribed state in which the access network does not have subscription information about the UE.

69. The apparatus of claim 68, the instructions being further executable by the processor to cause the apparatus to:
transition from the unsubscribed state to a deregistered state upon completing the local subscription establishment procedure.

70. The apparatus of claim 49, the instructions being further executable by the processor to cause the apparatus to:
enter an unsubscribed state of the UE upon determining that local subscription information for the UE is unavailable at the access network;
transition to a deregistered state; and
camp on the access network upon obtaining credentials for the access network through the local subscription establishment procedure.

71. The apparatus of claim 49, the instructions being further executable by the processor to cause the apparatus to:
determine to establish a connection with a VPLMN upon losing a connection with the access network.

72. The apparatus of claim 49, wherein the access network comprises a non-operator controlled access point.

73. A non-transitory computer-readable medium storing code for wireless communication, the code comprising instructions executable to:
identify, by a user equipment (UE), an access network as a candidate for connection, wherein the access network is outside of a home public land mobile network (HPLMN) of the UE, and wherein the instructions executable to identify the access network as a candidate for connection comprise instructions executable to:
determine an availability of the access network for a connection by the UE as roaming user or as an unsubscribed user;
determine whether the access network supports a local subscription establishment procedure;
determine that the UE is authorized to initiate the local subscription establishment procedure with the access network; and
establish, by the UE through the local subscription establishment procedure with the access network, a local subscription based at least in part on determining that the access network supports the local subscription establishment procedure and determining that the UE is authorized to initiate the local subscription establishment procedure, wherein the local subscription is different from a home subscription with the HPLMN.

74. The non-transitory computer-readable medium of claim 73, the instructions being further executable to:
prompt a user of the UE to choose between initiating the local subscription establishment procedure or accessing the access network as the roaming user; and
receive a user input to initiate the local subscription establishment procedure.

75. The non-transitory computer-readable medium of claim 73, the instructions being further executable to:
obtain credentials for accessing the access network.

76. The non-transitory computer-readable medium of claim 75, the instructions being further executable to:
obtain the credentials for accessing the access network in-band with the access network.

77. The non-transitory computer-readable medium of claim 73, wherein the access network comprises a public land mobile network (PLMN).

78. The non-transitory computer-readable medium of claim 73, the instructions being further executable to:
identify the access network based on a PLMN identifier or other access network identifier.

79. The non-transitory computer-readable medium of claim 78, the instructions being further executable to:
determine that the PLMN identifier or other access network identifier is present in a list of allowed networks.

80. The non-transitory computer-readable medium of claim 78, the instructions being further executable to:
determine that the PLMN identifier or other access network identifier is excluded from a list of forbidden networks.

81. The non-transitory computer-readable medium of claim 73, the instructions being further executable to:
identify the access network based at least in part on determining that the UE is within a coverage area of the access network.

82. The non-transitory computer-readable medium of claim 81, the instructions being further executable to:
identify the access network based at least in part on determining that the UE is outside the coverage area of an HPLMN of the UE.

83. The non-transitory computer-readable medium of claim 73, the instructions being further executable to:
determine by the UE that it is permitted to establish a local subscription with the access network based at least in part on a configuration of the UE.

84. The non-transitory computer-readable medium of claim 83, wherein the configuration of the UE comprises a flag from a home subscription.

85. The non-transitory computer-readable medium of claim 83, wherein the configuration of the UE comprises restrictions related to at least one of a current location of the UE, a time of day, an absence of other available coverage, or applications currently active on the UE.

86. The non-transitory computer-readable medium of claim 83, wherein the configuration of the UE comprises a management object at the UE, and wherein the management object facilitates establishing the local subscription with the access network.

87. The non-transitory computer-readable medium of claim 73, the instructions being further executable to:
display information about available networks to a user of the UE; and
receive input from the user indicative of an access network at which to initiate the local subscription establishment procedure.

88. The non-transitory computer-readable medium of claim 87, the instructions being further executable to:
receive input from the user to display the information about available networks.

89. The non-transitory computer-readable medium of claim 73, wherein initiating the local subscription establishment procedure comprises:
establishing a session with a provisioning server.

90. The non-transitory computer-readable medium of claim 89, the instructions being further executable to:
receive credentials for the access network from the provisioning server.

91. The non-transitory computer-readable medium of claim 73, wherein initiating the local subscription establishment procedure comprises:
transmitting a connection establishment request via the access network, the connection establishment request indicative of a desired provisioning server.

92. The non-transitory computer-readable medium of claim 73, the instructions being further executable to:
initiate the local subscription establishment procedure in an unsubscribed state in which the access network does not have subscription information about the UE.

93. The non-transitory computer-readable medium of claim 92, the instructions being further executable to:
transition from the unsubscribed state to a deregistered state upon completing the local subscription establishment procedure.

94. The non-transitory computer-readable medium of claim 73, the instructions being further executable to:
enter an unsubscribed state of the UE upon determining that local subscription information for the UE is unavailable at the access network;
transition to a deregistered state; and
camp on the access network upon obtaining credentials for the access network through the local subscription establishment procedure.

95. The non-transitory computer-readable medium of claim 73, the instructions being further executable to:
determine to establish a connection with a VPLMN upon losing a connection with the access network.

96. The non-transitory computer-readable medium of claim 73, wherein the access network comprises a non-operator controlled access point.

* * * * *